US012599895B2

(12) United States Patent
Espinoza

(10) Patent No.: US 12,599,895 B2
(45) **Date of Patent: \*Apr. 14, 2026**

(54) FISCHER-TROPSCH CATALYSTS

(71) Applicant: Dimensional Energy, Inc., Ithaca, NY (US)

(72) Inventor: Rafael Luis Espinoza, Tulsa, OK (US)

(73) Assignee: Dimensional Energy, Inc., Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/262,763

(22) Filed: Jul. 8, 2025

(65) Prior Publication Data

US 2025/0332577 A1      Oct. 30, 2025

Related U.S. Application Data

(63) Continuation of application No. 18/672,659, filed on May 23, 2024, now Pat. No. 12,377,402, which is a continuation of application No. 18/367,579, filed on Sep. 13, 2023, now Pat. No. 12,042,785.

(51) Int. Cl.
| | |
|---|---|
| *B01J 23/75* | (2006.01) |
| *B01J 35/30* | (2024.01) |
| *B01J 35/37* | (2024.01) |
| *B01J 35/63* | (2024.01) |
| *B01J 35/64* | (2024.01) |
| *B01J 37/04* | (2006.01) |
| *B01J 37/08* | (2006.01) |

(52) U.S. Cl.
CPC .............. *B01J 23/75* (2013.01); *B01J 35/30* (2024.01); *B01J 35/37* (2024.01); *B01J 35/633* (2024.01); *B01J 35/647* (2024.01); *B01J 37/04* (2013.01); *B01J 37/08* (2013.01)

(58) Field of Classification Search
CPC ........ B01J 23/75; B01J 35/647; B01J 35/633; B01J 35/37; B01J 37/04; B01J 37/08
See application file for complete search history.

(56) References Cited

U.S. PATENT DOCUMENTS

| | | | |
|---|---|---|---|
| 4,362,651 A | 12/1982 | Schwarzenbek | |
| 4,585,798 A | 4/1986 | Beuther et al. | |
| 4,605,676 A | 8/1986 | Kobylinski et al. | |
| 4,670,475 A | 6/1987 | Mauldin | |
| 8,067,333 B2 | 11/2011 | Visagie et al. | |
| 8,778,832 B2 | 7/2014 | Rekker et al. | |
| 8,791,041 B2 | 7/2014 | Duvenhage et al. | |
| 8,969,231 B2 | 3/2015 | Rytter et al. | |
| 9,023,900 B2 | 5/2015 | Wang et al. | |
| 9,233,358 B1 * | 1/2016 | Jothimurugesan | B01J 23/75 |
| 9,266,097 B2 | 2/2016 | Fang et al. | |
| 9,358,526 B2 | 6/2016 | Espinoza et al. | |
| 9,586,198 B2 * | 3/2017 | Park | B01J 37/0045 |
| 9,631,147 B2 | 4/2017 | Schuetzle et al. | |
| 9,827,554 B2 | 11/2017 | Nagayasu et al. | |
| 12,042,785 B1 | 7/2024 | Espinoza | |
| 12,377,402 B2 * | 8/2025 | Espinoza | B01J 37/08 |
| 2019/0143306 A1 | 5/2019 | Decottignies et al. | |

FOREIGN PATENT DOCUMENTS

| | | | | |
|---|---|---|---|---|
| CN | 110876933 A | * | 3/2020 | B01J 37/088 |
| EP | 0455307 A1 | | 11/1991 | |

OTHER PUBLICATIONS

"International Search Report and Written Opinion Received for Application No. PCT/US2023/032588 mailed on Apr. 26, 2024", 84 Pages.

Butt, et al., "Activation, Deactivation and Poisoning of Catalysts", Academic Press Inc, Harcourt Brace Jovanovich Publishers, 1988, 10-19.

Ergun, S., "Fluid Flow Through Packed Columns", Chem. Eng. Prog., 1952, 89-95.

Yates, et al., "Intrisic Kinetics of the Fischer-Tropsch Synthesis on a Cobalt Catalyst", Energy & Fuels 1991, 5, 168-173, 168-173.

\* cited by examiner

*Primary Examiner* — Yong L Chu

(74) *Attorney, Agent, or Firm* — Billion & Armitage

(57) ABSTRACT

A Fischer-Tropsch catalyst includes a substantially homogeneous blend of cobalt and alumina, wherein the catalyst includes a pore volume (PV) ranging from 0.3 cc/g to 0.5 cc/g and an average pore diameter (PD) ranging from 18 nm to 30 nm. Methods of preparing the Fischer-Tropsch catalyst are also included in the present disclosure.

7 Claims, 14 Drawing Sheets

202    CONTACT A FEED STOCK WITH A CATALYST, SUFFICIENT TO
GENERATE A REACTION PRODUCT

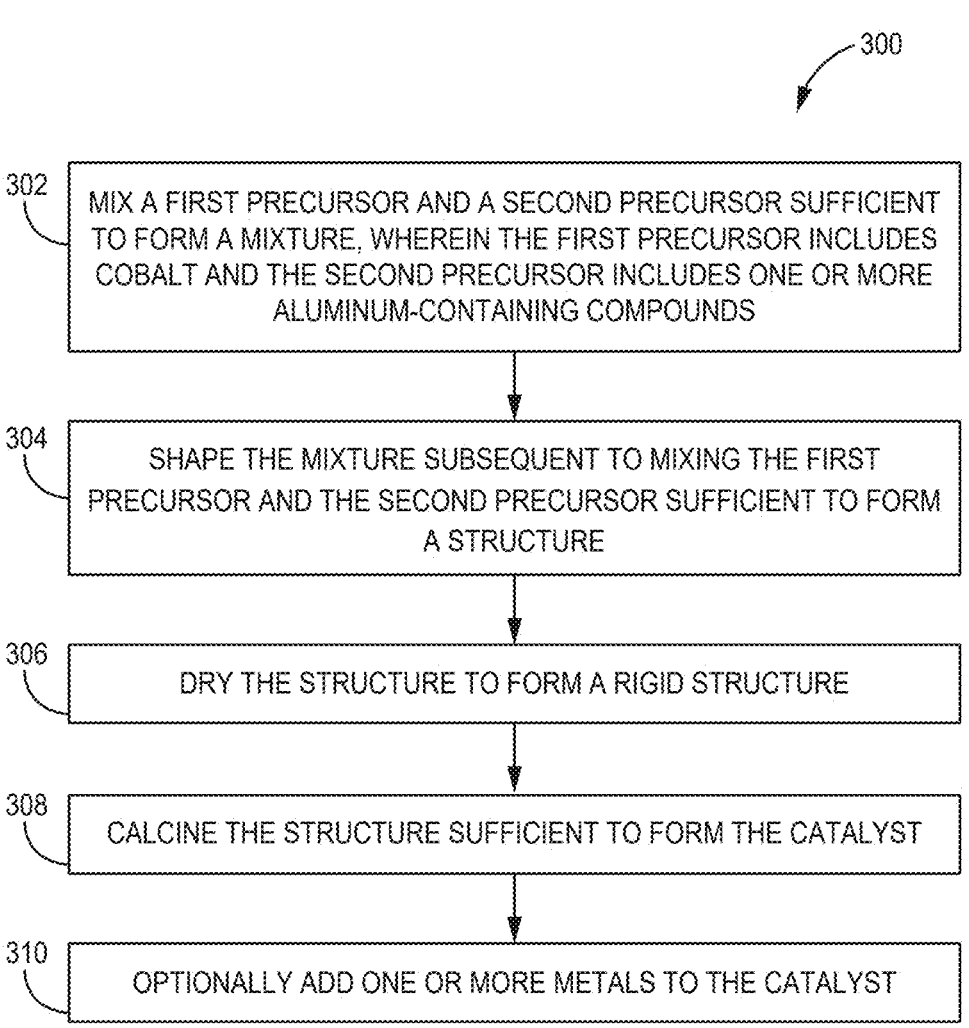

302  MIX A FIRST PRECURSOR AND A SECOND PRECURSOR SUFFICIENT TO FORM A MIXTURE, WHEREIN THE FIRST PRECURSOR INCLUDES COBALT AND THE SECOND PRECURSOR INCLUDES ONE OR MORE ALUMINUM-CONTAINING COMPOUNDS

304  SHAPE THE MIXTURE SUBSEQUENT TO MIXING THE FIRST PRECURSOR AND THE SECOND PRECURSOR SUFFICIENT TO FORM A STRUCTURE

306  DRY THE STRUCTURE TO FORM A RIGID STRUCTURE

308  CALCINE THE STRUCTURE SUFFICIENT TO FORM THE CATALYST

310  OPTIONALLY ADD ONE OR MORE METALS TO THE CATALYST

FIG. 3

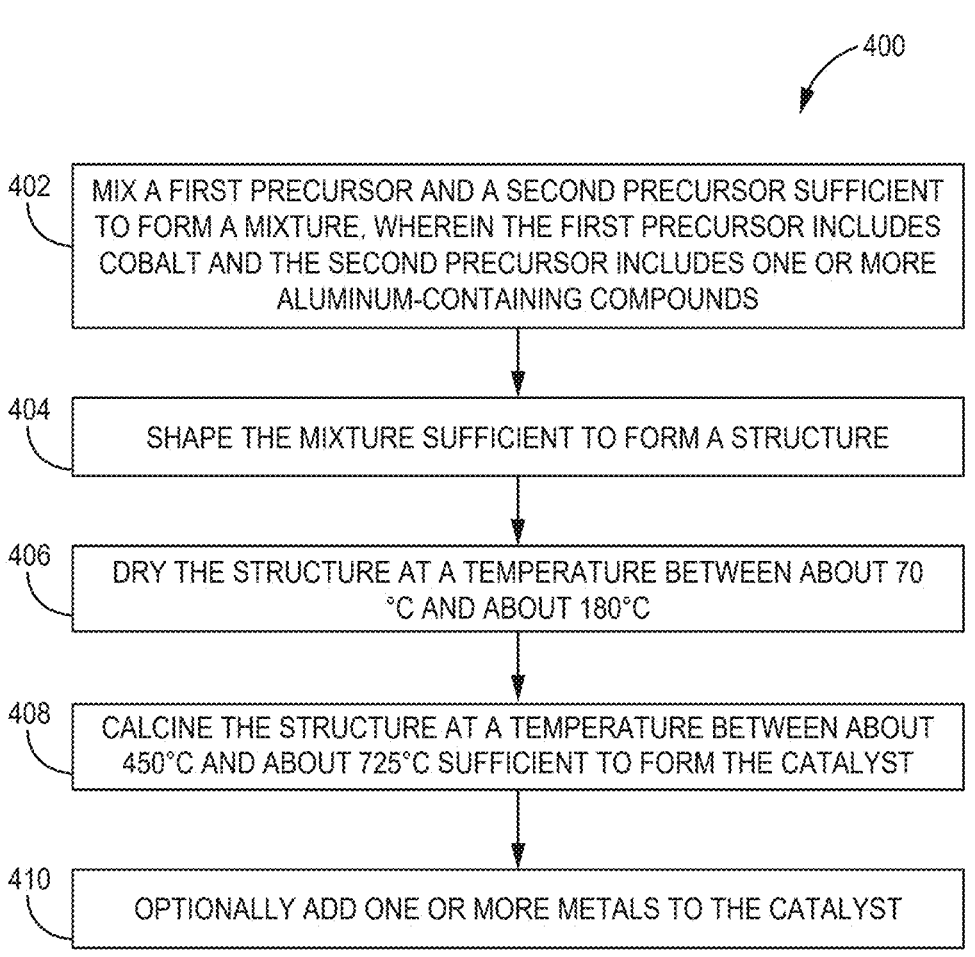

402 — MIX A FIRST PRECURSOR AND A SECOND PRECURSOR SUFFICIENT TO FORM A MIXTURE, WHEREIN THE FIRST PRECURSOR INCLUDES COBALT AND THE SECOND PRECURSOR INCLUDES ONE OR MORE ALUMINUM-CONTAINING COMPOUNDS

404 — SHAPE THE MIXTURE SUFFICIENT TO FORM A STRUCTURE

406 — DRY THE STRUCTURE AT A TEMPERATURE BETWEEN ABOUT 70 °C AND ABOUT 180°C

408 — CALCINE THE STRUCTURE AT A TEMPERATURE BETWEEN ABOUT 450°C AND ABOUT 725°C SUFFICIENT TO FORM THE CATALYST

410 — OPTIONALLY ADD ONE OR MORE METALS TO THE CATALYST

FISCHER-TROPSCH CATALYSTS

CROSS-REFERENCE TO RELATED APPLICATIONS

This application is a Continuation of U.S. application Ser. No. 18/672,659 (U.S. Pat. No. 12,377,402), titled "FISCHER-TROPSCH CATALYSTS", filed May 23, 2024, the contents of which are incorporated by reference herein. U.S. application Ser. No. 18/672,659 is a Continuation of U.S. application Ser. No. 18/367,579 (U.S. Pat. No. 12,042,785), filed Sep. 13, 2023, the contents of which are incorporated by reference herein. A claim of priority is made.

BACKGROUND

The Fischer-Tropsch process is a catalytic chemical reaction for converting carbon monoxide and hydrogen into hydrocarbons of various molecular weights. Depending on the catalyst and the operating conditions, different molecular weight hydrocarbons may be produced. The Fischer-Tropsch reaction is highly exothermic, and this process may include one or more reactors, separations units, compressors, heat exchangers, and recycle streams. Reactors utilized for the Fischer-Tropsch process may include fixed bed reactors, fluidized bed reactors, tubular fixed bed reactors, and slurry bed reactors. Typically, the input hydrogen and carbon monoxide must be compressed to high pressures before entering the reactor, and the reactor typically includes a catalyst for increasing the rate of reaction. While many catalysts have been created for the Fischer-Tropsch reaction, these catalysts may suffer from quick degradation, sintering, and expensive and lengthy formulation processes. Further, catalyst selectivity and activity control are still a major challenge in this catalytic reaction. Accordingly, it is desirable to efficiently prepare a Fischer-Tropsch catalyst with excellent activity, selectivity, and stability.

SUMMARY

According to one aspect, a Fischer-Tropsch catalyst includes a substantially homogeneous blend of cobalt and alumina, wherein the catalyst includes a pore volume (PV) ranging from 0.3 cc/g to 0.5 cc/g and an average pore diameter (PD) ranging from 18 nm to 30 nm.

According to another aspect, a method of preparing a Fischer-Tropsch catalyst includes: (1) mixing a first precursor and a second precursor sufficient to form a mixture, wherein the first precursor includes cobalt and the second precursor includes one or more aluminum-containing compounds; (2) shaping the mixture subsequent to mixing the first precursor and the second precursor sufficient to form a structure; (3) drying the structure; (4) calcining the structure sufficient to form the catalyst; and (5) optionally adding one or more metals to the catalyst; wherein the catalyst includes a pore volume (PV) and an average pore diameter (PD) and the catalyst in the oxide form follows the formula: $PV^{0.5} \times PD^{0.65} > 2$, wherein PV is measured in cc/g and PD is measured in nm.

According to another aspect, a method of preparing a Fischer-Tropsch catalyst includes: (1) mixing a first precursor and a second precursor sufficient to form a mixture, wherein the first precursor includes cobalt and the second precursor includes one or more aluminum-containing compounds; (2) shaping the mixture sufficient to form a structure; (3) drying the structure at a temperature between about 70° C. and about 180° C.; (4) calcining the structure at a temperature between about 450° C. and about 750° C. sufficient to form the catalyst; and (5) optionally adding one or more metals to the catalyst; wherein the catalyst includes cobalt oxide, and wherein at least 25 wt. % of the cobalt oxide in the catalyst before reduction is provided by the first precursor.

This summary is intended to provide an overview of subject matter of the present disclosure. It is not intended to provide an exclusive or exhaustive explanation of the invention. The detailed description is included to provide further information about the present patent application.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 3 illustrates a method 300 of preparing a Fischer-Tropsch catalyst, according to some embodiments.

FIG. 4 illustrates a method 400 of preparing a Fischer-Tropsch catalyst, according to some embodiments.

FIG. 7 illustrates the pore size distribution of a Fischer-Tropsch catalyst, according to some embodiments.

DETAILED DESCRIPTION

Definitions

Figure 1:
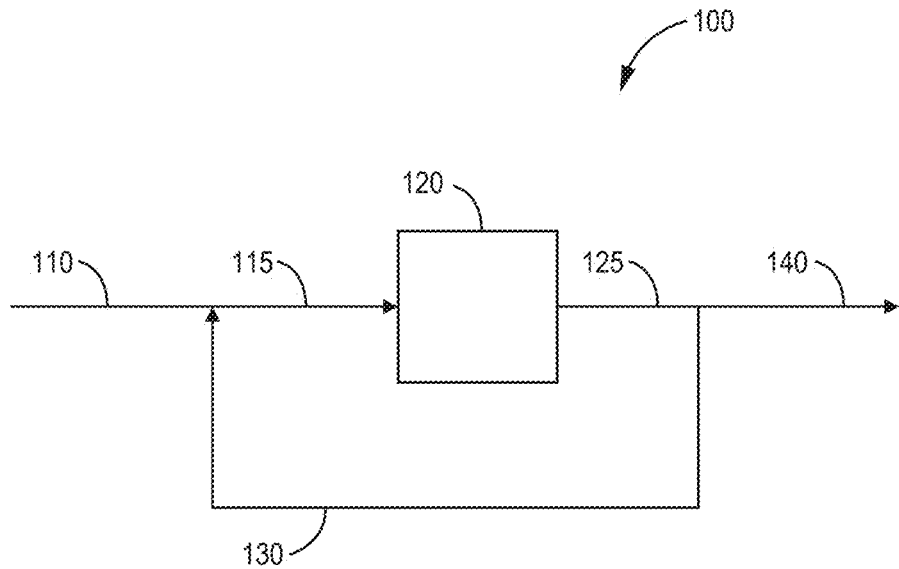
FIG. 1 illustrates system 100 for Fischer-Tropsch synthesis, according to some embodiments.

As used herein, the terms "catalyst", "catalytic material", or the like refer to material which enables a chemical reaction to proceed at a faster rate or under different conditions (e.g., at a lower temperature) than otherwise possible. The catalysts of the present disclosure may be tuned and designed for the Fischer-Tropsch catalytic reaction.

Further, the catalysts of the present invention may include mixtures of two or more catalytic material(s) with other inert materials. The catalytic materials used in the present invention may be formed into desired shapes or sizes.

Discussion

The Fischer-Tropsch (FT) process utilizes a catalyst for converting carbon monoxide and hydrogen into hydrocarbons of various molecular weights. The catalyst may speed up the chemical reaction and/or reduce the temperature required to initiate the chemical reaction. An example equation for a reaction in the Fischer-Tropsch process is shown below as Equation 1, where n=1 or more. A side reaction in the Fischer-Tropsch process may be the water gas shift reaction, shown as Equation 2.

$$(2n+1)H_2 + nCO \rightarrow C_nH_{(2n+2)} + nH_2O \tag{1}$$

$$CO + H_2O \leftrightarrows H_2 + CO_2 \tag{2}$$

The inlet ratio of reactants, $H_2$ and CO, may be adjusted using a synthesis gas production process. In one example, the Fischer-Tropsch reaction may operate at temperatures above about 180° C. and pressures above about 20 bar. Conventional catalysts suffer from inefficient selectivity and activity values. Further, these conventional catalysts require extensive formation steps. Accordingly, it is desirable to utilize a catalyst capable of maintaining a high selectivity while reducing undesirable reactions.

Embodiments of the present disclosure provide a novel Fischer-Tropsch catalyst composition and methods of preparing the Fischer-Tropsch catalyst. This Fischer-Tropsch catalyst may be referred to herein as "catalyst". Many conventional catalysts suffer from quick degradation, sintering, and expensive and lengthy formulation processes. The catalysts of the present disclosure are efficiently formed to tune mechanical and/or chemical properties of the catalyst for the Fischer-Tropsch reaction. Further, the present catalyst exhibits excellent activity and stability even after a long time in a Fischer-Tropsch reactor.

The catalyst may include a blend of cobalt (such as from $Co_3O_4$) and alumina (such as $Al_2O_3$). The catalyst may further include iron and/or ruthenium. Further, the catalyst may be a fully unsupported catalyst. In one example, the catalyst includes one or more structural promoters. In another example, the catalyst includes one or more reduction promoters. In yet another example, the catalyst includes one or more pore regulating agents. The pore regulating agents may include a polymer including two or more elements of C, H, O, and N. For example, the pore regulating agent may be polyethylene glycol (PEG). The pore regulating agent may change the catalyst structure, such as by increasing the pore volume.

One or more structural promoter precursors may be added during the catalyst formation process. The structural promoter may increase the mechanical strength and crushing strength of the catalyst. Further, the structural promoter may improve the mechanical strength of alumina in the catalyst and may allow for higher pore volumes and larger pore diameters. In one example, the structural promoter precursor includes one or more of any phase of alumina, silica, titania, zirconia, and mixtures thereof. In another example, the structural promoter precursor includes silicic acid. Accordingly, the catalyst composition may include a structural promoter selected from one or more of alumina, aluminum, silica, silicon, titania, titanium, zirconia, and zirconium. The catalyst composition may include a structural promoter selected from one or more of alumina, silicon oxide, titanium oxide, and zirconium oxide. The weight percentage of the structural promoter in the catalyst may range from about 0.1 wt. % to about 10 wt. %. The weight percentage of the structural promoter in the catalyst may range from about 0.2 wt. % to about 5 wt. %.

One or more reduction promoter precursors may be added to the catalyst during the formation process. The reduction promoter may lower the reduction temperature in the catalyst formation process. This may eliminate the need for a hot oil system in the Fischer-Tropsch production facility. In one example, the reduction promotor precursor includes one or more of platinum salt, palladium salt, ruthenium salt, and silver salt. Accordingly, the reduction promoter may include one or more of platinum, palladium, ruthenium, and silver. In one example, the reduction promoter includes one or more group 8 elements and/or group 11 elements. For example, the reduction promoter may include one or more of iron, osmium, copper, and gold. The weight percentage of the reduction promoter in the catalyst may range from about 0.05 wt. % to about 10 wt. %. In another example, the weight percentage of the reduction promoter in the catalyst may range from about 0.05 wt. % to about 5 wt. %.

The catalyst may include one or more of silica, silicon, titania, titanium, zirconia, and zirconium. The catalyst may include one or more of iron, platinum, palladium, ruthenium, osmium, chromium, and silver. In one example, the catalyst includes two or more of silica, silicon, titania, titanium, zirconia, zirconium, iron, platinum, palladium, ruthenium, and silver. The catalyst may include one or more of copper, gold, magnesium, calcium, vanadium, chromium, molybdenum, and manganese. In another example, the catalyst includes ruthenium and silver. In yet another example, the catalyst includes a blend of cobalt, silver, and alumina.

The weight percentage of cobalt in the catalyst may range from about 4 wt. % to about 50 wt. %. In one example, the weight percentage of cobalt in the catalyst ranges from about 7 wt. % to about 45 wt. %. In another example, the weight percentage of cobalt in the catalyst ranges from about 10 wt. % to about 40 wt. %. In yet another example, the weight percentage of cobalt in the catalyst ranges from about 20 wt. % to about 40 wt. %, or from about 20 wt. % to about 30 wt. %. For example, the weight percentage of cobalt in the catalyst may be about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, or values therebetween.

The weight percentage of alumina in the catalyst may range from about 50 wt. % to about 90 wt. %. In one example, the weight percentage of alumina in the catalyst ranges from about 60 wt. % to about 90 wt. %. In another example, the weight percentage of alumina in the catalyst ranges from about 60 wt. % to about 80 wt. %. In yet another example, the weight percentage of alumina in the catalyst ranges from about 65 wt. % to about 75 wt. %.

The addition of a silver compound with cobalt may lower the reduction temperature in the catalyst formation process. For example, silver nitrate may be added with cobalt nitrate during the catalyst formation process. This may eliminate the need for a hot oil system in the Fischer-Tropsch production facility. Accordingly, due to this lowered reduction temperature, the activation process may utilize steam instead of oil. The weight percentage of silver in the catalyst may range from about 0.01 wt. % to about 10 wt. %. In one example, the weight percentage of silver in the catalyst ranges from about 0.01 wt. % to about 5 wt. %. In another example, the weight percentage of silver in the catalyst ranges from about 0.05 wt. % to about 3 wt. %. In yet another example, the weight percentage of silver in the catalyst ranges from about 0.1 wt. % to about 1 wt. %.

By including ruthenium in the catalyst, the catalyst may exhibit a high degree of reduction at a commercial plant. The weight percentage of ruthenium in the catalyst may range from about 0.01 wt. % to about 10 wt. %. In one example, the weight percentage of ruthenium in the catalyst ranges from about 0.01 wt. % to about 5 wt. %. In another example, the weight percentage of ruthenium in the catalyst ranges from about 0.05 wt. % to about 3 wt. %. In yet another example, the weight percentage of ruthenium in the catalyst ranges from about 0.1 wt. % to about 1 wt. %. The weight percentage of iron in the catalyst may range from about 0.01 wt. % to about 10 wt. %. In one example, the weight percentage of iron in the catalyst ranges from about 0.01 wt. % to about 5 wt. %. In another example, the weight percentage of iron in the catalyst ranges from about 0.05 wt. % to about 3 wt. %. In yet another example, the weight percentage of iron in the catalyst ranges from about 0.1 wt. % to about 1 wt. %.

The blend of cobalt and alumina (aluminum oxide) may be formed from a pre-shaped mixture of cobalt and one or more aluminum-containing compounds. In one example, the aluminum-containing compound includes one or more of alumina and boehmite (aluminum oxide hydroxide). In one non-limiting example, boehmite is a particular phase of alumina. The blend of cobalt and alumina in the catalyst after calcination may be in the form of a substantially homogenous blend, mixture, and/or aggregate. After calcination, a substantially homogenous blend may feature a substantially consistent and/or uniform distribution of cobalt and alumina throughout the catalyst structure and/or bulk (such as from the outer surface of the catalyst toward the center of the catalyst particle). For example, in contrast to a conventional catalyst where metal salt is added/impregnated on an already shaped/rigid support to form a layered structure, the catalyst of the present disclosure may be one or more of unlayered and unsupported. In one example, an unsupported catalyst includes a catalyst wherein 100 wt. % of the cobalt in the final catalyst composition was added prior to catalyst shaping. In another example, at least a portion of the cobalt in the catalyst may be entirely surrounded by alumina. In yet another example, cobalt is in contact with alumina in external and internal pore spaces.

In one example, cobalt in the catalyst is in contact with the alumina. In another example, cobalt in the catalyst is further in contact with alumina pore walls. At least 25 wt. % of the cobalt in the catalyst may be blended with alumina. In one example, at least 40 wt. % of the cobalt in the catalyst may be blended with alumina. In another example, at least 60 wt. % of the cobalt in the catalyst may be blended with alumina. Additional cobalt may optionally be added via impregnation. For example, a remainder of cobalt not blended may be attached to the outer surface of the alumina and/or external pores of the alumina.

The average catalyst pore volume (PV), such as after calcination, may range from about 0.1 cc/g (cm³/g) to about 1 cc/g. In one example, the average catalyst pore volume ranges from about 0.2 cc/g to about 0.8 cc/g. In another example, the average catalyst pore volume ranges from about 0.2 cc/g to about 0.6 cc/g. In yet another example, the average catalyst pore volume ranges from about 0.3 cc/g to about 0.5 cc/g. The average catalyst pore diameter (PD), such as after calcination, may range from about 5 nm to about 50 nm. In one example, the average catalyst pore diameter ranges from about 10 nm to about 50 nm. In another example, the average catalyst pore diameter ranges from about 15 nm to about 40 nm. In yet another example, the average catalyst pore diameter ranges from about 15 nm to about 30 nm. A larger pore diameter may increase the catalyst productivity as larger and easier to reduce crystallites may be formed during the formation process. These larger crystallites are more resistant to oxidation. Further, a larger average pore diameter improves diffusion. In one example, the catalyst has a surface area lower than about 120 m²/g. Surface area of the catalyst may be calculated using: Surface Area=4000×(PV/PD), wherein PV is measured in cc/g and PD is measured in nm.

The catalyst exhibits excellent mechanical strength to avoid breakage during different stages of catalyst preparation, transportation, and loading within a reactor. Further, since the pressure drop in a reactor increases as the average particle size decreases, it is preferable to avoid particle breakage. The intrinsic cohesion or mechanical strength of a particle is its resistance to crushing, or its crushing strength. In one example, the crushing strength of the catalyst ranges from about 0.8 kg/mm to about 10 kg/mm. In another example, the crushing strength of the catalyst ranges from about 1 kg/mm to about 10 kg/mm. In yet another example, the crushing strength of the catalyst ranges from about 1.5 kg/mm to about 10 kg/mm. For example, the crushing strength of the catalyst may be greater than 1 kg/mm, greater than 2 kg/mm, greater than 3 kg/mm, greater than 4 kg/mm, or values therebetween.

The catalyst may include the product of mixing a cobalt salt with one or more aluminum-containing compounds prior to extrusion and calcination. For example, shaping is performed prior to any impregnation and calcination. This may form a blend or amalgamation (such as merging into one form). The catalyst may include the product of mixing cobalt nitrate and silver nitrate with one or more aluminum-containing compounds prior to extrusion and calcination. In one example, 20 wt. % to 75 wt. %, or at least 25 wt. %, of the cobalt in the catalyst after calcination and prior to reduction is present from the mixing of cobalt nitrate and silver nitrate with one or more aluminum-containing compounds. In another example, 30 wt. % to 60 wt. % of the cobalt in the catalyst after calcination and prior to reduction is present from the mixing of cobalt nitrate and silver nitrate with one or more aluminum-containing compounds. In yet another example, the cobalt nitrate includes about 10 wt. % cobalt to about 20 wt. % cobalt and the catalyst is reduced at a temperature below 260° C.

In some embodiments, the inventive catalysts are formed into predetermined shapes. For example, the inventive catalysts can take the form of spherical particles or beads, porous beads, pellets, tubes, Raschig rings, Super Raschig rings, Pall rings, Białecki rings, extrudates, lobes, saddles, and/or other shapes.

The intrinsic activity ($K_t$) of the catalyst is calculated according to the Fischer-Tropsch kinetic equation shown as Equation 3 below. In one example, the activity of the catalyst may be greater than 0.5E13. In another example, the activity of the catalyst may be greater than 1E13. In yet another example, the activity of the catalyst is greater than 1.2E13. In one example, the alpha value is at least 0.91.

$$K_t = \left[ e^{(-106.3\,kJ/mol/T)} \; P_{H2}^{1.2} P_{CO}^{1.2} / (1 + a\,P_{CO}) \right] / r_{-CO} \qquad (3)$$

where, $$a = 0.02192 \times T(K) - 8.865;$$

$r_{-CO}$ is the FT reaction rate expressed as vol CO reacted/ vol cat/h;

Kt is the pre-exponential factor or the catalyst intrinsic activity;

ΔE is the activation energy: 106.3 KJ/mol;

R is the Universal gas constant, 8.31 J/mol/K;

T is the reaction temperature, in K;

"a" is the desorption constant; and $P_{H2}$ and $P_{CO}$ are the partial pressures of hydrogen and carbon monoxide, in atm.

Surprisingly, for any given set of reaction conditions, the rate of reaction is a strong function of the pore volume and the pore diameter. Accordingly, activity ($K_t$) may follow Equation 4:

$$K_t = \text{function} \left( PV^{0.5} \times PD^{0.65} \right) \qquad (4)$$

where PV=pore volume and PD=pore diameter. In one example, the pore volume (PV) and pore diameter (PD) of the catalyst follow the formula: $PV^{0.5} \times PD^{0.65} > 2$. In another example, the pore volume (PV) and pore diameter (PD) of the catalyst follow the formula: $PV^{0.5} \times PD^{0.65} > 3$. In yet another example, the pore volume (PV) and pore diameter (PD) of the catalyst follow the formula: $PV^{0.5} \times PD^{0.65} > 4$.

In the past, the role of the pore volume (per cc (cm³) of whole catalyst volume) in terms of rate of reaction has not been understood. Since the pores are filled with wax, there may be a mixture of hydrocarbon products and reactants (such as CO and H₂) dissolved in the wax. The greater the pore volume, the higher the number of reactant molecules that will be absorbed on an active place per unit time, therefore increasing the rate of the reaction. Thus, the rate of reaction is a function, among other parameters, of the diffusion of products out and reactants into this internal volume of liquid wax (larger pore diameter, faster diffusion) and the amount of reactants dissolved in the internal wax. Since the amount of reactants per unit of liquid wax volume may be restricted by the solubility, a greater amount of empty volume inside the catalyst particle may allow for a greater amount of reactants in the catalyst particle.

Importantly, the catalyst pore volume and pore diameter may be tuned for a high reaction rate in the Fischer-Tropsch process. The pore volume and pore diameter may be tuned by adding varying amounts of cobalt prior to extrusion. For example, mixing a cobalt nitrate and silver nitrate solution with one or more aluminum-containing compounds prior to extrusion may provide a catalyst with a sufficient pore volume and pore diameter for a desired reaction rate in the Fischer-Tropsch process. Further, adding cobalt prior to extrusion decreases the number of required impregnation steps and increases the mechanical strength of the catalyst particle compared to a catalyst made by impregnating cobalt on a pre-shaped alumina support. Accordingly, this catalyst is efficiently formed and exhibits a high activity, reaction rate, and mechanical strength for the Fischer-Tropsch process.

FIG. 1 illustrates a Fischer-Tropsch reaction system 100, according to some embodiments. Reaction system 100 includes feed stream 110, total feed 115, reactor 120, initial product stream 125, optional recycle stream 130, and final product stream 140. Feed stream 110 may include Fischer-Tropsch reactants, such as hydrogen and carbon monoxide. In one example, the molar ratio of hydrogen to carbon monoxide in feed stream 110 ranges from about 1.2:1 to about 2.1:1. In another example, the molar ratio of hydrogen to carbon monoxide in feed stream 110 ranges from about 1.5:1 to about 1.8:1. In yet another example, the molar ratio of hydrogen to carbon monoxide in feed stream 110 ranges from about 1.6:1 to about 1.7:1. Feed stream 110 may further include one or more of methane, carbon dioxide, nitrogen, argon, and light gaseous hydrocarbons. The gas hourly space velocity (GHSV) is calculated using the volumetric flow rate of the feed stream 110 divided by the volume of the catalyst. The GHSV may range from about 1000 to about 3000. In one example, the GHSV ranges from about 1500 to 2500.

Reactor 120 may include the catalyst of the present disclosure. In one example, reactor 120 is selected from a fixed bed reactor, slurry reactor, ebullient reactor, and fluidized bed reactor. Reactor 120 may operate at temperatures sufficient to perform the Fischer-Tropsch reaction. In one example, reactor 120 is operated at a temperature between about 150° C. and about 400° C. In another example, reactor 120 is operated at a temperature between about 170° C. and about 250° C. In yet another example, reactor 120 is operated at a temperature between about 170° C. and about 200° C. The activation temperature may be lower than 475° C. Reactor 120 may operate at pressures sufficient to perform the Fischer-Tropsch reaction. In one example, reactor 120 is operated at a pressure between about 20 bar and 40 bar. In another example, reactor 120 is operated at a pressure between about 25 bar and 35 bar. In yet another example, reactor 120 is operated at a pressure between about 28 bar and 33 bar.

Initial product stream 125 and/or final product stream 140 includes one or more hydrocarbons. Accordingly, reactor 120 is sufficient to convert synthesis gas to hydrocarbons from processes such as the reverse water gas shift (RWGS) reaction. The catalyst may be sufficient to convert at least 180 cc CO/cc catalyst per hour. Initial product stream 125 and/or final product stream 140 may further include nitrogen, carbon dioxide, argon, and methane. Initial product stream 125 and/or final product stream 140 may include, or be used to directly produce, light olefins, gasoline, diesel, jet fuel, paraffins, wax, lubes, drilling fluids, primary olefins, and hydrocarbon-based chemicals.

System 100 may include optional recycle stream 130. The recycle may be calculated based on the volume rate of total feed 115 divided by the volume rate of feed stream 110. Therefore, the recycle amount may range from about 0.1 to 5. In one example, the recycle amount ranges from about 1 to about 2. If optional recycle stream 130 is not utilized, the composition and flow rate of feed stream 110 and total feed 115 are the same. In one example, the single pass conversion of carbon monoxide in feed stream 110 is greater than 40%. In another example, the single pass conversion of carbon monoxide in feed stream 110 is greater than 50%. In one example, by using optional recycle stream 130, the total carbon monoxide conversion may be greater than 85%, greater than 87%, or greater than 90%. The methane selectivity of the catalyst may be less than 10 wt. %. In one example, the methane selectivity of the catalyst is less than about 5 wt. %. In one example, the activity of the catalyst may be greater than 0.5E13. In another example, the activity of the catalyst may be greater than 1E13. In yet another example, the activity of the catalyst is greater than 1.2E13.

Figure 2:
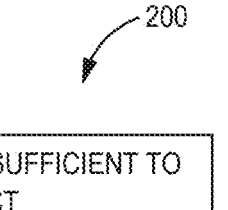
FIG. 2 illustrates a method 200 of processing a feed stock, according to some embodiments.

Referring to FIG. 2, a method of processing a feed stock is illustrated according to some embodiments. Method 200 includes the following steps:

STEP 202, CONTACT A FEED STOCK WITH A CATALYST, SUFFICIENT TO GENERATE A REACTION PRODUCT, includes contacting a feed stock including carbon monoxide and hydrogen with a catalyst of the present disclosure, sufficient to generate a reaction product. In one example, the molar ratio of hydrogen to carbon monoxide in the feed stock ranges from about 1.2:1 to about 2.1:1. In another example, the molar ratio of hydrogen to carbon monoxide in the feed stock ranges from about 1.5:1 to about 1.8:1. In yet another example, the molar ratio of hydrogen to carbon monoxide in the feed stock ranges from about 1.6:1 to about 1.65:1. The feed stock may further include one or more of methane, carbon dioxide, nitrogen, and argon. The GHSV may range from about 1000 to about 4000. In one example, the GHSV ranges from about 1500 to 2500. The feed stock may be contacted with the catalyst in a reactor, such as reactor 120.

In one example, the feed stock is contacted with the catalyst at a temperature between about 150° C. and about 250° C. In another example, the feed stock is contacted with the catalyst at a temperature between about 170° C. and about 250° C. In yet another example, the feed stock is contacted with the catalyst at a temperature between about 170° C. and about 210° C. In one example, the feed stock is contacted with the catalyst at a pressure between about 15 bar and 40 bar. In another example, the feed stock is contacted with the catalyst at a pressure between about 25 bar and 35 bar. In yet another example, the feed stock is contacted with the catalyst at a pressure between about 28 bar and 33 bar. The reaction product includes one or more hydrocarbons. The reaction product stream may further include nitrogen, carbon dioxide, argon, methane, and light gaseous hydrocarbons. The reaction product may include, or be used to directly produce, light olefins, gasoline, diesel, jet fuel, paraffins, wax, lubes, drilling fluids, primary olefins, and hydrocarbon-based chemicals.

In one example, the single pass conversion of carbon monoxide in feed stream 110 is greater than 30%. In another example, the single pass conversion of carbon monoxide in feed stream 110 is greater than 40%. In yet another example, the single pass conversion of carbon monoxide in feed stream 110 is greater than 50%. The methane selectivity of the catalyst may be less than 18 wt. %. In one example, the methane selectivity of the catalyst is less than about 10 wt. %. In yet another example, the methane selectivity of the catalyst is less than about 8 wt. %. In one example, the activity of the catalyst may be greater than 0.5E13. In another example, the activity of the catalyst may be greater than 1E13. In yet another example, the activity of the catalyst is greater than 1.2E13.

Referring to FIG. 3, a method 300 of preparing a Fischer-Tropsch catalyst is illustrated according to some embodiments. Method 300 prepares catalysts of the present disclosure and includes the following steps:

STEP 302, MIX A FIRST PRECURSOR AND A SECOND PRECURSOR SUFFICIENT TO FORM A MIXTURE, WHEREIN THE FIRST PRECURSOR INCLUDES COBALT AND THE SECOND PRECURSOR INCLUDES ONE OR MORE ALUMINUM-CONTAINING COMPOUNDS, includes mixing a first precursor and a second precursor sufficient to form a mixture, wherein the first precursor includes cobalt, such as a cobalt containing solution, and the second precursor includes one or more aluminum-containing compounds, such as in a powder form. Powder may include microparticles (such as between 0.1 μm and 200 μm). Mixing may include slowly adding one or more components to ensure homogeneous distribution. Mixing may include slowly adding one or more components to prevent/reduce the formation of agglomerates. Mixing may include physically contacting the first precursor and the second precursor.

The first precursor may include a cobalt salt solution, such as a cobalt nitrate solution. For example, the first precursor may be formed by mixing and/or dissolving cobalt nitrate salt in water. The first precursor may include one or more of nano cobalt metal particles, nano ruthenium metal particles, and nano silver metal particles. The weight percentage of cobalt metal in the cobalt nitrate molecule may be about 20.3%. In one example, the weight percentage of cobalt metal in the cobalt salt solution ranges from about 2 wt. % to about 20 wt. %. In another example, the weight percentage of cobalt metal in the cobalt salt solution ranges from about 12 wt. % to about 17 wt. %. In yet another example, the weight percentage of cobalt metal in the cobalt salt solution is about 15 wt. %.

The first precursor may further include one or more of a reduction promoter, metal salts, and a structural promoter (such as one other than alumina). In one example, the one or more metal salts are selected from an iron salt, a ruthenium salt, a silver salt, a platinum salt, and a palladium salt. In another example, the one or more metal salts include silver nitrate. For example, silver nitrate may be mixed and/or dissolved in water or directly added to the cobalt salt solution. In one example, a silver nitrate solution with a silver concentration ranging from about 2 wt. % to about 10 wt. % may be utilized. The first precursor may further include one or more of silicic acid hydrate, water, and nitric acid. In one non-limiting example, the first precursor includes a mixture or solution of water, silver nitrate, and cobalt nitrate. Additionally, the first precursor may include a pore regulating agent, such as a polymer including two or more of C, H, N, and O.

The second precursor includes one or more aluminum-containing compounds. In one example, the aluminum-containing compound includes one or more of boehmite and alumina (any phase of alumina). The second precursor may further include one or more of aluminum, silica, silicon, titania, titanium, zirconia, and zirconium. For example, the second precursor may include, in addition to one or more aluminum-containing compounds, silicon metal oxide(s) and/or zirconium metal oxide(s). These metal oxides may be in any phase. In one example, the second precursor includes two or more of aluminum, silica, silicon, titania, titanium, zirconia, and zirconium. In another example, the second precursor includes two or more distinct types of boehmites. The second precursor may further include 20 wt. % or less of small crystallite size boehmite. For example, the selection of the boehmite crystallite size has an influence on the formation of pore diameter and pore volume after calcination. Boehmite may allow for a larger pore volume and larger pore diameter compared to other materials. For example, the second precursor may include two distinct types of boehmite with differing crystallite sizes. These distinct forms of boehmite may be mixed prior to being combined with the first precursor. The mixture may be in the form of a paste;

STEP 304, SHAPE THE MIXTURE SUBSEQUENT TO MIXING THE FIRST PRECURSOR AND THE SECOND PRECURSOR SUFFICIENT TO FORM A

STRUCTURE, includes shaping the mixture, such as into a structure, subsequent to mixing the first precursor and the second precursor. A rigid structure may not be flexible or substantially bendable. Shaping the mixture may include extruding the mixture. Extruding the mixture may include providing an extruder and forcing the mixture through the extruder sufficient to form the structure. The extruder may form a shaped structure of a fixed cross-sectional profile. In addition, or alternatively, shaping the mixture may include spray drying the mixture.

Many typical extrusion processes suffer from extrudability of the paste and stickiness, among other detrimental characteristics. For an alumina/boehmite precursor, the LOI (loss on ignition: a relative measure of the total water content of the paste to be extruded) is a parameter than has a very high influence on pore diameter and pore volume. As the LOI increases, the pore diameter and pore volume also increase. On the other hand, and due to the pore volume increase, as the LOI increases the crushing strength decreases. In addition, the extrudates may stick to one another. Equation 5 calculates the LOI for the extrusion of a boehmite.

$$LOI = 100 \times \frac{H_2O \text{ in boehmite powder (g)} + H_2O \text{ added to powder(g)}}{g \text{ of dry } Al_2O_3} \quad (5)$$

The $H_2O$ in boehmite powder may be calculated based on the weight loss (%) when the boehmite is calcined at high temperatures, such as at 950° C. or higher. In one example, the weight loss (%) ranges from about 16% to about 25%. Since cobalt can be combined with boehmite prior to extrusion, and one cobalt nitrate molecule includes 6 molecules of water, this molecular water content should be considered. Therefore, the modified loss on ignition (MLOI) may be calculated using Equation 6 below.

$$MLOI = 100 \times \frac{H_2O \text{ in boehmite powder (g)} + H_2O \text{ added to powder including } Co(NO_3)_2 \cdot 6H_2O \text{ (g)}}{g \text{ of dry } Al_2O_3} \quad (6)$$

Accordingly, Equation 6 may account for water in the cobalt nitrate solution and crystallite water in the cobalt nitrate molecule. In one example, the MLOI value of the mixture may range from about 20 to 80. In another example, the MLOI value of the mixture ranges from 30 to 60. In another example, an MLOI value between 30 and 60 prevents high differential pressures during extrusion and/or prevents or reduces the tendency of extrudates sticking to one another. It may be desirable to prevent stickiness of particles and/or provide an MLOI sufficient for separation during a drying step. A lower MLOI may reduce stickiness. Further, the amount of cobalt added to the mixture may affect the degree of stickiness;

STEP 306, DRY THE STRUCTURE TO FORM A RIGID STRUCTURE, includes drying the structure, such as at/to a temperature above 50° C., to form a rigid structure. A rigid structure may not be flexible or substantially bendable, and a rigid structure may include a fixed cross-sectional shape. In one example, drying the structure includes heating the structure at/to a temperature between about 70° C. and 180° C. In another example, drying the structure includes heating the structure at/to a temperature between about 90° C.

and 150° C. In yet another example, drying the structure includes heating the structure at/to a temperature between about 100° C. and 130° C.;

STEP 308, CALCINE THE STRUCTURE SUFFICIENT TO FORM THE CATALYST, includes calcining the structure, such as at a temperature above 100° C., sufficient to form the catalyst. In one example, calcining the structure includes heating the structure at/to a temperature between about 120° C. and 800° C. In another example, calcining the structure includes heating the structure at/to a temperature between about 120° C. and 725° C. In yet another example, calcining the structure includes heating the structure at/to a temperature between about 500° C. and 725° C. In one example, calcination may remove one or more undesired substances from the structure. In another example, calcination may convert cobalt to a cobalt oxide phase. Calcination of the structure may be sufficient to decompose cobalt nitrate. Calcining the structure may include heating at a temperature below 500° C.;

STEP 310, OPTIONALLY ADD ONE OR MORE METALS TO THE CATALYST, includes optionally adding one or more metals (such as a reduction promoter) to the catalyst with one or more impregnations. If more than one impregnation is used, drying and calcination may be performed after each impregnation. In one example, the one or more metals include cobalt. The cobalt may be added using a solution of cobalt nitrate, wherein the weight percentage of cobalt in the cobalt nitrate solution ranges from about 10 wt. % to about 20 wt. %. If cobalt is added via impregnation, the calcination temperature after cobalt impregnation may range from about 300° C. to about 400° C.

The one or more metals may include a reduction promoter of the present disclosure. For example, the one or more metals may include ruthenium. In one non-limiting example, ruthenium may be added in an impregnation step without adding other metals during this step. The weight percentage of ruthenium in the catalyst may range from about 0.05 wt. % to about 0.5 wt. %. If ruthenium is added via impregnation, the calcination temperature after ruthenium impregnation may range from about 250° C. to about 350° C. In one example, ruthenium may be impregnated separately from cobalt nitrate to avoid interactions between ruthenium and compounds from cobalt nitrate decomposition. In another example, optional STEP 310 is completed three or less times. For example, STEP 310 may consist of three separate additions of the one or more metals.

The prepared catalyst includes a pore volume (PV) and an average pore diameter (PD) and the catalyst in the oxide form follows the formula: $PV^{0.5} \times PD^{0.65} > 2$, wherein PV is measured in cc/g and PD is measured in nm. In another example, the pore volume (PV) and pore diameter (PD) of the catalyst follow the formula: $PV^{0.5} \times PD^{0.65} > 3$. In yet another example, the pore volume (PV) and pore diameter (PD) of the catalyst follow the formula: $PV^{0.5} \times PD^{0.65} > 4$. The pore volume may be increased by methods of the present disclosure. If it is desirable to add more Fischer-Tropsch metal (such as cobalt) to the catalyst after calcination, a higher pore volume may allow a higher amount of Fischer-Tropsch metal to be added per impregnation step. While a higher pore volume is beneficial from a reactivity point of view, the catalyst crushing strength decreases when the pore volume increases. Accordingly, an optimal compromise between crushing strength and pore volume is desirable. Due to this, a calcined extrudate with a higher mechanical strength for any given pore volume is desirable.

Accordingly, the catalyst may include the product of mixing a cobalt salt with one or more aluminum-containing compounds prior to extrusion and calcination. For example, the catalyst may include the product of mixing cobalt nitrate and silver nitrate with one or more aluminum-containing compounds prior to extrusion and calcination. Since the first precursor is mixed with the second precursor prior to any shaping, 100% of the metal oxide(s) in the catalyst are present from the first precursor. If additional Fischer-Tropsch metals are added after calcination, the first precursor includes cobalt nitrate and the catalyst includes cobalt oxide, and between 20 wt. % to 75 wt. % of the cobalt oxide in the catalyst prior to reduction is present from the first precursor. In another example, the first precursor includes cobalt nitrate and the catalyst includes cobalt oxide, and between 30 wt. % to 70 wt. % of the cobalt oxide in the catalyst prior to reduction is present from the first precursor. In yet another example, the first precursor includes cobalt nitrate and the catalyst includes cobalt oxide, and between 40 wt. % to 60 wt. % of the cobalt oxide in the catalyst prior to reduction is present from the first precursor. Further, reduction promoters such as ruthenium may be added to the catalyst before and/or after shaping.

The weight percentage of cobalt in the prepared catalyst may range from about 4 wt. % to about 50 wt. %. In one example, the weight percentage of cobalt in the catalyst ranges from about 7 wt. % to about 45 wt. %. In another example, the weight percentage of cobalt in the catalyst ranges from about 10 wt. % to about 40 wt. %. In yet another example, the weight percentage of cobalt in the catalyst ranges from about 20 wt. % to about 30 wt. %. For example, the weight percentage of cobalt in the catalyst may be about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, or values therebetween.

The weight percentage of alumina in the prepared catalyst may range from about 50 wt. % to about 90 wt. %. In one example, the weight percentage of alumina in the catalyst ranges from about 60 wt. % to about 90 wt. %. In another example, the weight percentage of alumina in the catalyst ranges from about 60 wt. % to about 80 wt. %. In yet another example, the weight percentage of alumina in the catalyst ranges from about 65 wt. % to about 75 wt. %. In one example, the crushing strength of the prepared catalyst ranges from about 0.8 kg/mm to about 10 kg/mm. In another example, the crushing strength of the catalyst ranges from about 1 kg/mm to about 10 kg/mm. In yet another example, the crushing strength of the catalyst ranges from about 1.5 kg/mm to about 10 kg/mm. The crushing strength of the catalyst may be greater than 1 kg/mm, greater than 2 kg/mm, greater than 3 kg/mm, greater than 4 kg/mm, or values therebetween.

The prepared catalyst from method 300 may include a blend of cobalt and alumina, wherein the catalyst includes a pore volume (PV) ranging from 0.3 cc/g to 0.5 cc/g and an average pore diameter (PD) ranging from 18 nm to 30 nm. Method 300 may further include a hydrogen treatment of the formed catalyst. In one example, hydrogen treatment may reduce the cobalt oxide to cobalt metal. In another example, the catalyst is reduced at a temperature of 260° C. or less. The catalyst may be used in a fixed bed, slurry, ebullient bed, or fluidized bed Fischer-Tropsch reactor. Additionally, the catalyst may be used to produce directly or from further treatment of the Fischer-Tropsch primary products, light olefins, gasoline, diesel, paraffins, jet fuel, wax, lubes, drilling fluids, primary olefins and hydrocarbon based chemicals.

Referring to FIG. 4, a method 400 of preparing a Fischer-Tropsch catalyst is illustrated according to some embodiments. Method 400 includes the following steps:

STEP 402, MIX A FIRST PRECURSOR AND A SECOND PRECURSOR SUFFICIENT TO FORM A MIXTURE, WHEREIN THE FIRST PRECURSOR INCLUDES COBALT AND THE SECOND PRECURSOR INCLUDES ONE OR MORE ALUMINUM-CONTAINING COMPOUNDS, includes mixing a first precursor and a second precursor sufficient to form a mixture, wherein the first precursor includes cobalt, such cobalt containing solution, and the second precursor includes one or more aluminum-containing compounds, such as in the form of powder and/or microparticles. Mixing may include slowly adding one or more components to ensure homogeneous distribution. Mixing may include slowly adding one or more components to prevent/reduce the formation of agglomerates. Mixing may include physically contacting the first precursor and the second precursor.

The first precursor may include a cobalt salt solution, such as a cobalt nitrate solution. For example, the first precursor may be formed by mixing and/or dissolving cobalt nitrate salt in water. The first precursor may include one or more of nano cobalt metal particles, nano ruthenium metal particles, and nano silver metal particles. The weight percentage of cobalt metal in the cobalt nitrate molecule may be about 20.3%. In one example, the weight percentage of cobalt metal in the cobalt salt solution ranges from about 2 wt. % to about 20 wt. %. In another example, the weight percentage of cobalt metal in the cobalt salt solution ranges from about 12 wt. % to about 17 wt. %. In yet another example, the weight percentage of cobalt metal in the cobalt salt solution is about 15 wt. %.

The first precursor may further include one or more of a reduction promoter, metal salts, and a structural promoter (such as a structural promoter other than alumina). In one example, the one or more metal salts are selected from an iron salt, a ruthenium salt, a silver salt, a platinum salt, and a palladium salt. In another example, the one or more metal salts include silver nitrate. For example, silver nitrate may be mixed and/or dissolved in water or directly added to the cobalt salt solution. In one example, a silver nitrate solution with a silver concentration ranging from about 2 wt. % to about 10 wt. % may be utilized. The first precursor may further include one or more of silicic acid hydrate, water, and nitric acid. In one non-limiting example, the first precursor includes a mixture or solution of water, silver nitrate, and cobalt nitrate. Additionally, the first precursor may include a pore regulating agent, such as a polymer including two or more of C, H, N, and O.

The second precursor includes one or more aluminum-containing compounds. In one example, the aluminum-containing compound includes one or more of boehmite and alumina. In another example, the aluminum-containing compound includes boehmite. In yet another example, the aluminum-containing compound includes alumina. The second precursor may further include one or more of aluminum, silica, silicon, titania, titanium, zirconia, and zirconium. For example, the second precursor may include, in addition to the one or more aluminum-containing compounds, silicon metal oxide(s) and/or zirconium metal oxide(s). In one example, the second precursor includes two or more of aluminum, silica, silicon, titania, titanium, zirconia, and zirconium. In another example, the second precursor includes two or more distinct types of boehmite powders. The second precursor may further include 20 wt. % or less of small crystallite size boehmite. For example, the selection of the boehmite crystallite size will have an influence on the formation of pore diameter and pore volume after calcination. For example, the second precursor may include two distinct types of boehmite with differing crystallite sizes. These distinct forms of boehmite may be mixed prior to being combined with the first precursor. The mixture may be in the form of a paste;

STEP 404, SHAPE THE MIXTURE SUFFICIENT TO FORM A STRUCTURE includes shaping the mixture, such as from a paste, subsequent to mixing the first precursor and the second precursor. Shaping the mixture may include extruding the mixture. Extruding the mixture may include providing an extruder and forcing the mixture through the extruder sufficient to form a structure. The extruder may form a shaped structure of a fixed cross-sectional profile. In addition, or alternatively, shaping the mixture may include spray drying the mixture.

In one example, the MLOI value of the mixture may range from about 20 to 80. In another example, the MLOI value of the mixture ranges from 30 to 60. In another example, a MLOI value between 30 and 60 prevents and/or reduces extrudates from sticking to one another. It may be desirable to prevent stickiness of particles and/or provide an MLOI sufficient for separation during a drying step. Further, the amount of cobalt added to the mixture may affect the degree of stickiness;

STEP 406, DRY THE STRUCTURE AT A TEMPERATURE BETWEEN ABOUT 70° C. AND ABOUT 180° C., includes drying the structure sufficient to form a rigid structure. In one example, drying the structure includes heating the structure at/to a temperature between about 90° C. and 150° C. In another example, drying the structure includes heating the structure at/to a temperature between about 100° C. and 130° C.

STEP 408, CALCINE THE STRUCTURE AT A TEMPERATURE BETWEEN ABOUT 450° C. AND ABOUT 725° C. SUFFICIENT TO FORM THE CATALYST may include calcining the structure includes heating the structure at/to a temperature between about 500° C. and 725° C. Calcination of the structure may be sufficient to decompose cobalt nitrate. Calcining the structure may include heating at a temperature below 500° C.

STEP 410, OPTIONALLY ADD ONE OR MORE METALS TO THE CATALYST, includes optionally adding one or more metals (such as a reduction promoter) to the catalyst with one or more impregnations. If more than one impregnation is used, drying and calcination may be performed after each impregnation. STEP 410 may include three or fewer impregnations. In one example, the one or more metals include cobalt. The cobalt may be added using a solution of cobalt nitrate and/or acetate, wherein the weight percentage of cobalt in the cobalt nitrate solution ranges from about 2 wt. % to about 20 wt. %. If cobalt is added via impregnation, the calcination temperature after cobalt impregnation may range from about 300° C. to about 400° C. The one or more metals may include a reduction promoter of the present disclosure. For example, the one or more metals includes ruthenium. The weight percentage of ruthenium in the catalyst may range from about 0.05 wt. % to about 0.5 wt. %. If ruthenium is added via impregnation, the calcination temperature after ruthenium impregnation may range from about 250° C. to about 350° C. In one example, ruthenium may be impregnated separately from cobalt nitrate to avoid interactions between ruthenium and compounds from cobalt nitrate decomposition.

The prepared catalyst includes a pore volume (PV) and an average pore diameter (PD) and the catalyst in the oxide form follows the formula: $PV^{0.5} \times PD^{0.65} > 2$, wherein PV is measured in cc/g and PD is measured in nm. In another example, the pore volume (PV) and pore diameter (PD) of the catalyst follow the formula: $PV^{0.5} \times PD^{0.65} > 3$. In yet another example, the pore volume (PV) and pore diameter (PD) of the catalyst follow the formula: $PV^{0.5} \times PD^{0.65} > 4$.

Accordingly, the catalyst may include the product of mixing a cobalt salt with one or more aluminum-containing compounds prior to extrusion and calcination. For example, the catalyst may include the product of mixing cobalt nitrate and silver nitrate with boehmite prior to extrusion and calcination. In one non-limiting example, boehmite present prior to extrusion is converted to alumina during and/or after calcination. Since the first precursor is mixed with the second precursor prior to any shaping, 100% of the metal oxide(s) in the catalyst are present from the first precursor. If additional Fischer-Tropsch metals are added after calcination, the first precursor includes cobalt nitrate and the catalyst includes cobalt oxide, and between 20 wt. % to 75 wt. % of the cobalt oxide in the catalyst prior to reduction is present from the first precursor. The catalyst may include cobalt oxide and at least 25 wt. % of the cobalt oxide in the catalyst (such as prior to reduction) may be provided by the first precursor. In another example, the first precursor includes cobalt nitrate and the catalyst includes cobalt oxide, and between 30 wt. % to 70 wt. % of the cobalt oxide in the catalyst prior to reduction is present from the first precursor. In yet another example, the first precursor includes cobalt nitrate and the catalyst includes cobalt oxide, and between 40 wt. % to 60 wt. % of the cobalt oxide in the catalyst prior to reduction is present from the first precursor. Further, reduction promoters such as ruthenium may be added to the catalyst before and/or after shaping.

The weight percentage of cobalt in the prepared catalyst may range from about 4 wt. % to about 50 wt. %. In one example, the weight percentage of cobalt in the catalyst ranges from about 7 wt. % to about 45 wt. %. In another example, the weight percentage of cobalt in the catalyst ranges from about 10 wt. % to about 40 wt. %. In yet another example, the weight percentage of cobalt in the catalyst ranges from about 20 wt. % to about 30 wt. %. For example, the weight percentage of cobalt in the catalyst may be about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, or values therebetween.

The weight percentage of alumina in the prepared catalyst may range from about 50 wt. % to about 90 wt. %. In one example, the weight percentage of alumina in the catalyst ranges from about 60 wt. % to about 90 wt. %. In another example, the weight percentage of alumina in the catalyst ranges from about 60 wt. % to about 80 wt. %. In yet another example, the weight percentage of alumina in the catalyst ranges from about 65 wt. % to about 75 wt. %. In one example, the crushing strength of the prepared catalyst ranges from about 0.8 kg/mm to about 10 kg/mm. In another example, the crushing strength of the catalyst ranges from about 1 kg/mm to about 10 kg/mm. In yet another example, the crushing strength of the catalyst ranges from about 1.5 kg/mm to about 10 kg/mm. The crushing strength of the catalyst may be greater than 1 kg/mm, greater than 2 kg/mm, greater than 3 kg/mm, greater than 4 kg/mm, or values therebetween.

The prepared catalyst from method 400 may include a blend of cobalt and alumina, wherein the catalyst includes a pore volume (PV) ranging from 0.3 cc/g to 0.5 cc/g and an average pore diameter (PD) ranging from 18 nm to 30 nm. Method 400 may further include a hydrogen treatment of the formed catalyst. The catalyst may be used in a fixed bed, slurry, ebullient bed, or fluidized bed Fischer-Tropsch reactor. Additionally, the catalyst may be used to produce directly or from further treatment of the Fischer-Tropsch primary products, light olefins, gasoline, diesel, paraffins, jet fuel, wax, lubes, drilling fluids, primary olefins and hydrocarbon based chemicals.

Importantly, cobalt is mixed with the second precursor prior to shaping and calcination. Compared to conventional catalysts that add 100% of catalytically active materials through impregnation, the catalysts prepared with methods 300 and 400 are prepared with fewer impregnation steps. That is, the catalyst of the present disclosure may be formed from impregnating a reduction promoter after the first calcination and prior to reduction, and optionally adding more Fischer-Tropsch metal precursor to a calcined catalyst that already includes cobalt.

Additionally, catalysts of the present disclosure may exhibit a lowered reduction temperature compared to conventional catalysts due to the manner in which the reduction promoters are added to the catalyst. These catalysts of the present disclosure include an optimized pore volume and pore diameter for excellent activity in the Fischer-Tropsch reaction. Further, this blend of cobalt and alumina exhibits a high crushing strength compared to conventional catalysts formed by typical impregnation techniques. This higher crushing strength makes less fines in loading a reactor, therefore reducing pressure drop in a reactor, such as a fixed bed Fischer-Tropsch reactor.

Example 1—DE-54 Catalyst Preparation

The ingredients for one example of a prepared catalyst (DE-54) include cobalt nitrate salt, alumina P-100, alumina TH-200, silver nitrate, silicic acid hydrate, nitric acid, and water. Both P-100 and TH-200 alumina powders were thoroughly mixed before any liquid addition to ensure homogeneous mixing. The alumina in both the P-100 and the TH-200 was in the boehmite phase. The cobalt solution was prepared by adding water to the cobalt nitrate salt to obtain a Co weight percentage of 15 wt. % in the cobalt nitrate solution. The density of the solution was about 1.51 g/cc. Similarly, the silver solution was prepared by adding water to silver nitrate to obtain a concentration of 5 wt. % of Ag in the silver nitrate solution. The silver solution, silicic acid hydrate, nitric acid and additional water were added to the cobalt solution and stirred. The liquid was then slowly added to the alumina under continuous mixing to ensure homogeneous distribution as well as to minimize formation of agglomerates. At the lab scale, the process took about 30 minutes for a batch between 100 g to 150 g of combined alumina powders. The ingredients and the weight of each ingredient are provided in Table 1 below.

TABLE 1

| DE-54 Ingredients. | |
| --- | --- |
| Ingredients | |
| TH-200 (g) | 60.00 |
| P-100 (g) | 40.00 |
| Co Nitrate Sol (g) | 62.95 |
| 5 wt. % Ag Sol (g) | 4.63 |
| HNO3 (g) | 0.50 |
| Silicic Acid Hydrate (g) | 4.80 |
| Water (g) | 16.25 |

The extruder used was a Bonnot extruder, operating between 6 to 8 RPM. The extrudate composition (dry basis) is shown in Table 2 below. The initial drying temperature was 100° C. for about 20 minutes and then increased to 130° C. with a 90 minute holding time. The calcination took place in two stages, the first to decompose the cobalt nitrate and the second at a higher temperature. During the decomposition of the cobalt nitrate a small air flow was introduced to the furnace to avoid high concentrations of NOx's. The temperature program used is shown in Table 3 below. During the calcination step, the boehmite was converted to gamma alumina.

TABLE 2

| Extrudate composition (wt. %.) | |
| --- | --- |
| Extrudate Composition (dry basis) | Wt. % |
| $Al_2O_3$ | 84.47 |
| $SiO_2$ | 3.09 |
| $Co_3O_4$ | 12.18 |
| $Ag_2O$ | 0.26 |

TABLE 3

| Calcination of dried extrudate. | |
| --- | --- |
| Calcination of dried extrudate | |
| Temp, ° C. | Hold. time (min) |
| 130 | 10 |
| 170 | 10 |
| 220 | 20 |
| 250 | 20 |
| 275 | 20 |
| 300 | 30 |
| 675 | 90 |

Additional cobalt was added by means of two impregnations. Both impregnations were completed dropwise using a 3 ml pipet in a 1000 ml beaker during a period of about 30 minutes using a 15 wt. % Co solution prepared from the cobalt nitrate salt. The beakers with the catalyst and with the cobalt nitrate solution were on a heating plate at a temperature of about 65° C. (range used was 65 to 75° C.). After about ⅔ of the total solution (equal to about 63% of the water pickup pore volume) was impregnated, the time in between the addition of drops was increased to allow for the catalyst to fully absorb the liquid. During the whole process the beaker was frequently, slowly rotated and agitated with a circular motion so that the extruded particles rub each other gently. After impregnation is completed the material should look dry, in which case it can be placed in the furnace for drying and calcining. The weight percentages of the composition after the first impregnation and after the second impregnation are shown in Tables 4 and 5 below, respectively.

TABLE 4

| Composition after 1$^{st}$ impregnation. | |
| --- | --- |
| Composition after 1st impregnation | Wt. % |
| $Al_2O_3$ | 72.31 |
| $SiO_2$ | 2.65 |
| $Co_3O_4$ | 24.83 |
| $Ag_2O$ | 0.22 |

TABLE 5

| Composition after 2$^{nd}$ impregnation. | |
| --- | --- |
| Composition after 2nd impregnation | Wt.% |
| $Al_2O_3$ | 63.58 |
| $SiO_2$ | 2.33 |
| $Co_3O_4$ | 33.90 |
| $Ag_2O$ | 0.19 |

Ruthenium was added during a third impregnation step. The impregnation was similar to the cobalt nitrate impregnations although the total amount of liquid used was 105% of the pore volume. The weight percentage of ruthenium in the catalyst after the third impregnation was 0.2 wt. %. After each impregnation described, the material was placed in ceramic dishes and gently redistributed to minimize the thickness of the catalyst layer. The initial furnace temperature was 90° C. for about 15 minutes, and the temperature was increased to 120° C. for 30 minutes and then to 130° C. for 45 minutes. The final calcination temperatures were 350° C. after cobalt impregnation and 300° C. after the Ru impregnation. Same as for the calcination of the extrudate, during the decomposition of the cobalt nitrate a small air flow was introduced to the furnace to avoid high concentrations of NOx's. The temperature program used is shown in the table 6 below.

TABLE 6

| Calcination temperature program. Calcination after impregnations | |
| --- | --- |
| Temp, ° C. | Hold. time, min |
| 130 | 10 |
| 170 | 10 |
| 220 | 20 |
| 250 | 20 |
| 275 | 20 |
| 300 | 30 (*) |
| 350 | 20 (**) |

(*) Final temperature for the Ru impregnation. Remove material from furnace.
(**) Only for first and second Co impregnations.

Example 2—Catalyst Comparison

Table 7 shows various catalysts and the corresponding ingredients used to form the catalysts. As shown, prepared catalysts may include various ingredients, weight percentages, reduction promoters, structural promoters, pore regulating agents, pore diameters, pore volumes, and MLOI. Table 7 displays catalysts DE-1 through DE-57. DE-15 included the addition of small particles of cobalt oxide in the pre-shaped mixture. The average size of the small particles was about 50 microns. In one example, small micron particles may suffer from extrusion problems. DE-46 was prepared using cobalt metal nanoparticles. The equivalent of 25.2 Co wt. % was added before extrusion, along with 100% Pural 100 and structural promoters and Ag nitrate (Ru may also be added before extrusion). The water pore volume was about 0.37 cc/g for both 480 and 680° C. calcinations. BET (Brunauer-Emmett-Teller) shows 0.39 cc/g at 480° C. and 0.31 cc/g at 680° C. In one example, DE-46 does not need to be calcined at temperatures above 500° C. Further, the extrusion was fast, the extruder head cold, and there were no signs of stickiness. The crushing strength at the low and high calcination temperatures was very similar at 2.4 kg/mm and 2.49 kg/mm, respectively. Comparison catalysts may be referred to herein as "CC", such as CC-1, CC-2, and CC-3. For example, CC-1, CC-2, and CC-3 comparison catalysts are conventional cobalt catalysts supported on alumina. These CC catalysts do not have cobalt added to the composition prior to shaping like the catalysts of the present disclosure. MLOI-1 is calculated according to Equation 6, and MLOI-2 is calculated in the same manner with the weight of crystallite water excluded.

TABLE 7

| | | | Catalysts Prepared. | | | |
| --- | --- | --- | --- | --- | --- | --- |
| Ingredients and results | 1 | 2 | 3 | 4 | 5 | 6 |
| Pural 100, g | | | | | | |
| Pural 100, g | | | | | | |
| TH-100, g | 250 | 250 | | | 150 | 150 |
| TH-200, g | | | | | | |
| Other material-description | | | Catapal | Catapal | | |
| Other Calc. Cat. material, g | | | 250 | 250 | | |
| Co nitrate solution 15 wt % Co, g | 122.8 | 163.13 | 122.8 | 122.8 | 110 | 130 |
| Ag nitrate solution 5 wt % Ag, g | | | | | | |
| Water, g | 16 | 17 | 16 | 16 | 15 | 15 |
| Nitric acid, g | 1 | 1 | 1 | 1 | 1 | 0.95 |
| Wax, g | | | | | | |
| Silicic acid, g | | | | | | |

TABLE 7-continued

| Catalysts Prepared. | | | | | | |
|---|---|---|---|---|---|---|
| Al nitrate, g | 20.66 | 28.83 | 20.66 | 20.66 | | |
| MLOI-1 | 39.9 | 46.9 | 39.9 | 39.9 | 44 | 44.9 |
| MLOI-2 | 30.7 | 37 | 30.7 | 30.7 | 34 | 33.1 |
| Co metal wt %, Calcined (Calc.) Catalyst (Cat.) | 8.1 | 10.48 | 8.2 | 8.2 | 11.78 | 13.63 |
| Co metal wt %, Pre-reduction Cat. | 23.1 | | | | | |
| Calc. Cat. H2O PV-Calc. 450-480 C, cc/g | 0.367 | | | 0.425 | | |
| Calc. Cat. H2O PV-Calc. 670-680 C, cc/g | 0.416 | 0.41 | 0.46 | 0.522 | 0.395 | 0.432 |
| H2O PV Pre-reduction Cat., cc/g | 0.25 | | | | | |
| Crushing Strength Calc. Cat.-lb/mm | | 3.84 | | | 3.63 | 3.46 |
| Crushing Strength Pre-reduction Cat.-lb/mm | 7.5 | | | | | |
| Stickiness | low | low | low | low | | |
| Extruder head | hot | hot | hot | hot | warm/hot | warm/hot |
| BET Area Calc. Cat., m2/g | | | | | | |
| BET Area Pre-reduction Cat., m2/g | | | | | | |
| BET PV Calc. Cat., cc/g | | | | | | |
| BET PV Pre-reduction Cat., cc/g | | | | | | |
| BET Pore Diameter Calc. Cat., nm | | | | | | |
| BET Pore Diameter Pre-reduction Cat., nm | | | | | | |

| Ingredients and results | 7 | 8 | 9 | 11 | 12 |
|---|---|---|---|---|---|
| Pural 100, g | | | | | |
| Pural 100, g | | | | 150 | 150 |
| TH-100, g | 150 | 250 | 250 | | |
| TH-200, g | | | | | |
| Other material-description | | | | | |
| Other Calc. Cat. material, g | | | | | |
| Co nitrate solution 15 wt % Co, g | 81.4 | 192 | 192.00 | 44.00 | 62 |
| Ag nitrate solution 5 wt % Ag, g | | | | | |
| Water, g | 22.5 | 0 | 0 | 50 | 28.6 |
| Nitric acid, g | 0.6 | 0.6 | 0.6 | 0 | 0.7 |
| Wax, g | | | | | |
| Silicic acid, g | | | | | |
| Al nitrate, g | | | | | |
| MLOI-1 | 44.7 | 44.2 | 44.2 | 45.6 | 43.2 |
| MLOI-2 | 36.1 | 30.9 | 30.9 | 41.4 | 36.5 |
| Co metal wt %, Calcined (Calc.) Catalyst (Cat.) | 8.9 | 12.27 | 12.27 | 5.07 | 7 |
| Co metal wt %, Pre-reduction Cat. | | 26.78 | | | |
| Calc. Cat. H2O PV-Calc. 450-480 C, cc/g | 0.412 | | | 0.466 | |
| Calc. Cat. H2O PV-Calc. 670-680 C, cc/g | 0.439 | 0.43 | 0.43 | 0.502 | 0.468 |
| H2O PV Pre-reduction Cat., cc/g | | 0.3 | | | |
| | | | (helicoidal | | |
| Crushing Strength Calc. Cat.-lb/mm | 3.47 | 3.58 | <1 | | |
| Crushing Strength Pre-reduction Cat.-lb/mm | | 4.53 | dye) | | |
| Stickiness | | no | no | | |
| Extruder head | warm/hot | hot | hot | | |
| BET Area Calc. Cat., m2/g | | | | | |
| BET Area Pre-reduction Cat., m2/g | | | | | |
| BET PV Calc. Cat., cc/g | | | | | |
| BET PV Pre-reduction Cat., cc/g | | | | | |
| BET Pore Diameter Calc. Cat., nm | | | | | |
| BET Pore Diameter Pre-reduction Cat., nm | | | | | |

| Ingredients and results | 13 | 14 | 15 | 16 | 17 | 20 |
|---|---|---|---|---|---|---|
| Pural 100, g | | | | | | |
| Pural 100, g | 150 | 250 | 75 | 222.3 | 160 | 192.4 |
| TH-100, g | | | | | | |
| TH-200, g | | | | | | |
| Other material-description | | | | | Titania | Titania |
| Other Calc. Cat. material, g | | | | | 13.73 | 17.8 |
| Co nitrate solution 15 wt % Co, g | 81.5 | 192.00 | 112.7 | | 250.2 (solid) | 215 |

TABLE 7-continued

Catalysts Prepared.

| | | | | | | |
|---|---|---|---|---|---|---|
| Ag nitrate solution 5 wt % Ag, g | | | (of Co oxide) | | | |
| Water, g | 15.4 | 0 | 51 | 39.12 | 24.65 | 0 |
| Nitric acid, g | 0.65 | 0.6 | 0.4 | 0.5 | 0.5 | 1 |
| Wax, g | | | | | 5.21 | |
| Silicic acid, g | | | | | | |
| Al nitrate, g | | | (MLOI does not apply) | | | |
| MLOI-1 | 42.9 | 44.2 | 27.1 | 48.13 | 50.1 | 48.8 |
| MLOI-2 | 33.7 | 30.8 | 27.1 | 38.34 | 26.8 | 33.34 |
| Co metal wt %, Calcined (Calc.) Catalyst (Cat.) | 9 | 12.27 | 30 | 11 | 25.87 | 15.46 |
| Co metal wt %, Pre-reduction Cat. | 24.84 | | (plus Co for Co aluminates) | 25.14 | (one step cat prep) | (reverse mixing) |
| Calc. Cat. $H_2O$ PV-Calc. 450-480 C, cc/g | | | | | | |
| Calc. Cat. $H_2O$ PV-Calc. 670-680 C, cc/g | 0.45 | | 0.19 | 0.44 | | 0.344 |
| $H_2O$ PV Pre-reduction Cat., cc/g | 4.8 | | (extrud calc at 1050 oC) | 0.3 | 0.436 | |
| Crushing Strength Calc. Cat.-lb/mm | | | | | | 3.9 |
| Crushing Strength Pre-reduction Cat.-lb/mm | 4.97 | | | 5.23 | 1.2 | |
| Stickiness | no | no | watery | separated | sticky | separated |
| Extruder head | hot | hot | cold | warm | cold | warm |
| BET Area Calc. Cat., m2/g | | | | | | |
| BET Area Pre-reduction Cat., m2/g | 97 | | | 68.7 | | |
| BET PV Calc. Cat., cc/g | | | | | | |
| BET PV Pre-reduction Cat., cc/g | 0.29 | | | 0.31 | | |
| BET Pore Diameter Calc. Cat., nm | | | | | | |
| BET Pore Diameter Pre-reduction Cat., nm | 13 | | | 17.7 | | |

| Ingredients and results | 21 | 22 | 23 | 24 | 25 | 26 |
|---|---|---|---|---|---|---|
| Pural 100, g | | | | | | |
| Pural 100, g | 145.5 | 100 | | | | |
| TH-100, g | | | | | | |
| TH-200, g | | | 100 | 100 | 3.6 | 100 |
| Other material-description | Titania | Co Acetate | | | DE24 paste | |
| Other Calc. Cat. material, g | 13.34 | 128.9 | | | 74.5 | 74.9 |
| Co nitrate solution 15 wt % Co, g | 156.3 | | 117.65 | 100.3 | | |
| Ag nitrate solution 5 wt % Ag, g | | | | | | |
| Water, g | 0 | 0 | 0 | 0 | 0 | 21.3 |
| Nitric acid, g | 1 | 0.5 | 0.75 | 1 | 0 | 1 |
| Wax, g | | 3 | | | | |
| Silicic acid, g | | | | | | |
| Al nitrate, g | | | | | | |
| MLOI-1 | 48.1 | 40.2 | 43.66 | 50.2 | 48.5 | 51.4 |
| MLOI-2 | 32.92 | 18.01 | 28.77 | 31.54 | 34.63 | 41.8 |
| Co metal wt %, Calcined (Calc.) Catalyst (Cat.) | 15 | 27 | 17.64 | 15.44 | 13.82 | 12 |
| Co metal wt %, Pre-reduction Cat. | (hybrid mixing) | (difficult drying) | | | | |
| Calc. Cat. $H_2O$ PV-Calc. 450-480 C, cc/g | | | | | | |
| Calc. Cat. $H_2O$ PV-Calc. 670-680 C, cc/g | 0.289 | (Fluffy | 0.513 | 0.51 | 0.473 | 0.485 |
| $H_2O$ PV Pre-reduction Cat., cc/g | | material) | | | | |
| Crushing Strength Calc. Cat.-lb/mm | 3.83 | | 3.3 | 3.2 | 2.37 | 2.45 |
| Crushing Strength Pre-reduction Cat.-lb/mm | | | | | | |
| Stickiness | | | yes | yes | yes | yes |
| Extruder head | | | cold extrudates separated | cold extrudates separated | cold extrudates separated | cold extrudates separated |
| BET Area Calc. Cat., m2/g | | | | | | |
| BET Area Pre-reduction Cat., m2/g | | | | | | |
| BET PV Calc. Cat., cc/g | | | | | | |
| BET PV Pre-reduction Cat., cc/g | | | | | | |
| BET Pore Diameter Calc. Cat., nm | | | | | | |
| BET Pore Diameter Pre-reduction Cat., nm | | | | | | |

| Ingredients and results | 27 | 28 | 29 | 31 | 32 | 33 |
|---|---|---|---|---|---|---|
| Pural 100, g | | | | | | |
| Pural 100, g | | | | | | |

TABLE 7-continued

| Catalysts Prepared. | | | | | | |
|---|---|---|---|---|---|---|
| TH-100, g | | | | | | |
| TH-200, g | 100 | 100 | 100 | 100 | 100 | 100 |
| Other material-description | | | | | | |
| Other Calc. Cat. material, g | | | | | | solid CoN |
| Co nitrate solution 15 wt % Co, g | 74.9 | 61 | 61 | 67.8 | 54.1 | 72.7 |
| Ag nitrate solution 5 wt % Ag, g | | | | | | |
| Water, g | 0 | 28.5 | 10 | 0 | 10 | |
| Nitric acid, g | 1 | 1.35 | 1 | 0.2 | 0.2 | |
| Wax, g | | | | | | |
| Silicic acid, g | | 6 | 6 | 6 | 6 | |
| Al nitrate, g | | | | | | |
| MLOI-1 | 44.36 | 51.08 | 44.88 | 42.32 | 42.92 | 43.45 |
| MLOI-2 | 31.4 | 43.44 | 35 | 29.92 | 33.66 | 35.42 |
| Co metal wt %, Calcined (Calc.) Catalyst (Cat.) | 12 | 10 | 10 | 11 | 9 | 15.23 |
| Co metal wt %, Pre-reduction Cat. | | | | | 25.5 | |
| Calc. Cat. $H_2O$ PV-Calc. 450-480 C, cc/g | 0.447 | 0.575 | | 0.367 | | |
| Calc. Cat. $H_2O$ PV-Calc. 670-680 C, cc/g | | 0.624 | 0.512 | 0.434 | 0.508 | |
| $H_2O$ PV Pre-reduction Cat., cc/g | | | | | 0.328 | |
| Crushing Strength Calc. Cat.-lb/mm | 3.08 | 2.45 & 3.27 | 3.63 | S480 = 4.25 | S680 = 4.88 | |
| Crushing Strength Pre-reduction Cat.-lb/mm | | | | S680 => 4.5 | 5.15 | |
| Stickiness | low | low | no | low | low | sticky |
| Extruder head | warm | cold | warm | warm | warm | hot stop extr. |
| BET Area Calc. Cat., m2/g | | S450 = 113 | S670 = 84 | | 87 | |
| BET Area Pre-reduction Cat., m2/g | | S670 = 83 | | | 60 | |
| BET PV Calc. Cat., cc/g | | S450 = 0.60 | S670 = 0.51 | | 0.539 | |
| BET PV Pre-reduction Cat., cc/g | | S670 = 0.624 | | | 0.354 | |
| BET Pore Diameter Calc. Cat., nm | | S450 = 24.8 | S670 = 23 | | 23 | |
| BET Pore Diameter Pre-reduction Cat., nm | | S670 = 28.6 | | | 23.1 | |

| Ingredients and results | 35 | 36 | 37 | 38 | 39 | 40 |
|---|---|---|---|---|---|---|
| Pural 100, g | | | | | | 23.7 |
| Pural 100, g | | | | | | |
| TH-100, g | | | V250 | | | |
| TH-200, g | | | 67.5 | 100 | 73.2 | 39.02 |
| Other material-description | V-250 | V-250 | TiO2 | V-250 | V-250 | V-250 |
| Other Calc. Cat. material, g | 100 | 100 | 7.5 | 10.81 | 20 | 17.27 |
| Co nitrate solution 15 wt % Co, g | | 88.3 | 88.30 | 59.41 | 61.5 | 53.67 |
| Ag nitrate solution 5 wt % Ag, g | | | | | | |
| Water, g | 36.13 | 40 | 42.5 | 18 | | 23.3 |
| Nitric acid, g | 0.2 | 0.2 | 0.2 | 0.2 | | 0.2 |
| Wax, g | | | | | | |
| Silicic acid, g | | | | | | |
| Al nitrate, g | | | | | | |
| MLOI-1 | 60.73 | 61.51 | 66.28 | 46.52 | 49.52 | 51.1 |
| MLOI-2 | 52.6 | 53.73 | 58.36 | 38.47 | 40.47 | 42.45 |
| Co metal wt %, Calcined (Calc.) Catalyst (Cat.) | 15 | 15 | 19.06 | 9 | 10.86 | 11.05 |
| Co metal wt %, Pre-reduction Cat. | | | 30.68 | | | |
| Calc. Cat. $H_2O$ PV-Calc. 450-480 C, cc/g | 0.452 | 0.457 | 0.452 | 0.457 | 0.53 | 0.545 |
| Calc. Cat. $H_2O$ PV-Calc. 670-680 C, cc/g | 0.463 | 0.507 | 0.463 | | | |
| $H_2O$ PV Pre-reduction Cat., cc/g | | 0.335 | | | | |
| Crushing Strength Calc. Cat.-lb/mm | S480 = 12.4 | >10 | >10 | 5.08 | 5.18 | 4.51 |
| Crushing Strength Pre-reduction Cat.-lb/mm | S680 = 17 | >10 | >10 | | | |
| Stickiness | no | no | no | no | low | wet/low st |
| Extruder head | warm | lukewarm | lukewarm | warm | cold | cold |
| BET Area Calc. Cat., m2/g | | | Calc 680 C | 128 | 135 | 143 |
| BET Area Pre-reduction Cat., m2/g | | 133 | 119 | | | |
| BET PV Calc. Cat., cc/g | | | | 0.47 | 0.535 | 0.527 |
| BET PV Pre-reduction Cat., cc/g | | 0.354 | 0.289 | | | |
| BET Pore Diameter Calc. Cat., nm | | | | 15.4 | 15.5 | 14.5 |
| BET Pore Diameter Pre-reduction Cat., nm | | 8.9 | 8.2 | | | |

TABLE 7-continued

Catalysts Prepared.

| Ingredients and results | 41 | 42 | 43 | 44 | 45 | 46 |
|---|---|---|---|---|---|---|
| Pural 100, g | | | | | | |
| Pural 100, g | 85.4 | 48.8 | 100 hybrid mix | 50 | | 100.5 |
| TH-100, g | | | | | | |
| TH-200, g | 18.1 | 48.8 | | 50 | 48.2 | |
| Other material-description | V250 | | | | p100-1075° C | |
| Other Calc. Cat. material, g | 20 | | | | 40 | nano Co |
| Co nitrate solution 15 wt % Co, g | 82.4 | 59.26 | 73.33 | 74.3 | 59.3 | 37.7 |
| Ag nitrate solution 5 wt % Ag, g | | 4.27 | 3.68 | 4.6 | 4.27 | 4.4 |
| Water, g | 23 | 15.23 | 13.43 | 18 | 20 | 57 |
| Nitric acid, g | 0.2 | 0.2 | 0.37 | 0.4 | 0.2 | 2.4 |
| Wax, g | | | | | | acA + nitric Ac |
| Silicic acid, g | | 6 | 6 | 4.8 | 6 | |
| Al nitrate, g | | | | | | 12.36 |
| MLOI-1 | 45.13 | 47.87 | 49.29 | 49.3 | 57.07 | 49.34 |
| MLOI-2 | 34.07 | 39.18 | 42 | 41.78 | 51.33 | 49.34 |
| Co metal wt %, Calcined (Calc.) Catalyst (Cat.) | 11 | 11.08 | 11.06 | 11.89 | 10 | 30 |
| Co metal wt %, Pre-reduction Cat. | | | | 27.33 | calc 600° C | |
| Calc. Cat. H2O PV-Calc. 450-480 C, cc/g | | 0.431 | | 0.434 | 0.506 | 0.368 |
| Calc. Cat. H2O PV-Calc. 670-680 C, cc/g | 0.459 | 0.48 | 0.417 | 0.456 | | 0.37 |
| H2O PV Pre-reduction Cat., cc/g | | | | 0.321 | | |
| Crushing Strength Calc. Cat.-lb/mm | 10.34 | S480 = 5.88 | | S680 = 4.39 | <1.5 | 480 C = 5.33 |
| Crushing Strength Pre-reduction Cat.-lb/mm | | S680 = 4.71 | 5.75 | 5.94 | | 680 C = 5.53 |
| Stickiness | low | no | no | low | wet/low | low |
| Extruder head | cold | warm | lukewarm | cold | cold | cold |
| BET Area Calc. Cat., m2/g | 146 | S680 = 80 | 91.6 | 85 | 66.7 | 480 C = 99 |
| BET Area Pre-reduction Cat., m2/g | | | | 63 | | 680 C = 78 |
| BET PV Calc. Cat., cc/g | 0.464 | S680 = 0.509 | 0.471 | 0.535 | 0.556 | 480 C = 0.388 |
| BET PV Pre-reduction Cat., cc/g | | | | 0.352 | | 680 C = 0.305 |
| BET Pore Diameter Calc. Cat., nm | 12.1 | S680 = 23 | 18 | 23 | 30.5 | 480 C = 16.7 |
| BET Pore Diameter Pre-reduction Cat., nm | | | | 23.3 | | 680 C = 19.2 |

| Ingredients and results | 47 | 48 | 49 | 50 | 51 | 52 |
|---|---|---|---|---|---|---|
| Pural 100, g | | | | | | |
| Pural 100, g | 48.8 | 100 | | | | |
| TH-100, g | | | | | | |
| TH-200, g | 48.2 | | 48.8 | 75 | 100 | 100 |
| Other material-description | PEG | TH200-950 C | TH200-950 C | TH200-700 C | TH200-750 C | |
| Other Calc. Cat. material, g | 5 | 50 | 40 | 61.5 | 20 | |
| Co nitrate solution 15 wt % Co, g | 59.3 | 92.96 | 66 | 81.1 | 67.3 | 61 |
| Ag nitrate solution 5 wt % Ag, g | 4.27 | 5.75 | 4.27 | 6.55 | 5.44 | 4.37 |
| Water, g | 20 | 2.6 | 7.71 | 3.4 | 14.6 | 14.6 |
| Nitric acid, g | 0.2 | 0.5 | 0.6 | 1 | 0.75 | 0.5 |
| Wax, g | | | | | | 5 |
| Silicic acid, g | | | | | | |
| Al nitrate, g | | | did not extruded | 18.8 | 15.6 | 15.68 |
| MLOI-1 | 47.87 | 40.63 | 41.35 | 35.6 | 44.15 | 47.9 |
| MLOI-2 | 39.18 | 28.72 | 32.5 | 27.04 | 35.31 | 39.1 |
| Co metal wt %, Calcined (Calc.) Catalyst (Cat.) | 10 | 10.2 | 11 | 9 | 9 | 10 |
| Co metal wt %, Pre-reduction Cat. | | | | | | |
| Calc. Cat. H2O PV-Calc. 450-480 C, cc/g | 0.48 | 0.36 | | | | |
| Calc. Cat. H2O PV-Calc. 670-680 C, cc/g | | 0.39 | | 0.418 | 0.437 | 0.52 |
| H2O PV Pre-reduction Cat., cc/g | | | | | | |
| Crushing Strength Calc. Cat.-lb/mm | S480 = 4.32 | | S680 = 4.92 | 5.52 | 4.94 | 3.2 |
| Crushing Strength Pre-reduction Cat.-lb/mm | | | | | | |
| Stickiness | low | low | sticky | sticky | low | wet/low |
| Extruder head | lukewarm | warm | cold | very warm | lukewarm | cold |
| BET Area Calc. Cat., m2/g | S480 = 123 | S480 = 123 | 63.1 | | 79.5 | 74 |
| BET Area Pre-reduction Cat., m2/g | S680 = 88 | S680 = 88 | | | | |
| BET PV Calc. Cat., cc/g | S480 = 0.522 | S480 = 0.522 | 0.515 | | 0.49 | 0.573 |
| BET PV Pre-reduction Cat., cc/g | S680 = 0.539 | S680 = 0.539 | | | | |

TABLE 7-continued

Catalysts Prepared.

| | | | | | |
|---|---|---|---|---|---|
| BET Pore Diameter Calc. Cat., nm | S480 = 18.7 | S480 = 18.7 | 29.3 | 21.2 | 27.3 |
| BET Pore Diameter Pre-reduction Cat., nm | S680 = 22.8 | S680 = 22.8 | | | |

| Ingredients and results | 53 | 54 | 54-2-A | 54-2-B | 54-2-C |
|---|---|---|---|---|---|
| Pural 100, g | 40 | 40 | 60 | 2 Impreg. | 3 impreg. |
| Pural 100, g | | | | Used 54-2-A | Used 54-2-A |
| TH-100, g | | | | extrudate | extrudate |
| TH-200, g | 60 | 60 | 90 | But Ag also | But Ag also |
| Other material-description | | | | added on 2nd Co | added on 2nd and 3rd Co |
| Other Calc. Cat. material, g | | | | impreg. | impreg. |
| Co nitrate solution 15 wt % Co, g | 61 | 61 | 91.5 | tot Ag = 0.5 | tot Ag = 0.5 |
| Ag nitrate solution 5 wt % Ag, g | 4.37 | 4.37 | 7.2 | instead of | instead of |
| Water, g | 14.6 | 14.6 | 21.54 | 0.2 wt % | 0.2 wt % |
| Nitric acid, g | 0.5 | 0.5 | 0.8 | (as all other | (as all other |
| Wax, g | 3 | | | cats with Ag) | cats with Ag) |
| Silicic acid, g | 4.8 | 4.8 | 7.2 | No Ru | No Ru |
| Al nitrate, g | | | | No 3rd impreg. | |
| MLOI-1 | 47.9 | 47.9 | 47.44 | | |
| MLOI-2 | 39.1 | 39.1 | 38.62 | | |
| Co metal wt %, Calcined (Calc.) Catalyst (Cat.) | 10 | 10 | 10 | 10 | 10 |
| Co metal wt %, Pre-reduction Cat. | | 25.4 | 26.3 | 25.71 | 31.1 |
| Calc. Cat. H2O PV-Calc. 450-480 C, cc/g | | | | | |
| Calc. Cat. H2O PV-Calc. 670-680 C, cc/g | 0.490 | 0.487 | 0.488 | | |
| H2O PV Pre-reduction Cat., cc/g | | 0.337 | 0.340 | | |
| Crushing Strength Calc. Cat.-lb/mm | 4.24 | 4 | | | |
| Crushing Strength Pre-reduction Cat.-lb/mm | | 5.54 | | | |
| Stickiness | no | no | no | | |
| Extruder head | lukewarm | lukewarm | lukewarm | | |
| BET Area Calc. Cat., m2/g | 83.9 | 85.2 | 84.2 | | |
| BET Area Pre-reduction Cat., m2/g | | 63.3 | 67 | | 60 |
| BET PV Calc. Cat., cc/g | 0.521 | 0.51 | 0.51 | | |
| BET PV Pre-reduction Cat., cc/g | | 0.344 | 0.358 | | 0.302 |
| BET Pore Diameter Calc. Cat., nm | 23.1 | 22.1 | 21.8 | | |
| BET Pore Diameter Pre-reduction Cat., nm | | 21.4 | 21.5 | | 20.4 |

| Ingredients and results | 55-C | 56-A | 57 |
|---|---|---|---|
| Pural 100, g | (MLOI of | 60 | |
| Pural 100, g | 55A & 55B | ("Δ" dye) | |
| TH-100, g | too low) | | |
| TH-200, g | | 90 | |
| Other material-description | PB-01 | | Al Oxide = 90 |
| Other Calc. Cat. material, g | 100 | | PB-1 = 13.5 |
| Co nitrate solution 15 wt % Co, g | 61 | 91.5 | 67 |
| Ag nitrate solution 5 wt % Ag, g | 4.37 | 7.24 | |
| Water, g | equiv 24.3 | 24.3 | 95 |
| Nitric acid, g | 0.5 | 0.85 | 4 |
| Wax, g | | | (2 Ac + 2 Citr) |
| Silicic acid, g | 4.8 | 7.2 | 5 |
| Al nitrate, g | | | |
| MLOI-1 | 55.7 | 48.52 | |
| MLOI-2 | 48.7 | 40 | |
| Co metal wt %, Calcined (Calc.) Catalyst (Cat.) | 10.6 | 10 | |
| Co metal wt %, Pre-reduction Cat. | | 28.2 | |
| Calc. Cat. H2O PV-Calc. 450-480 C, cc/g | | | |
| Calc. Cat. H2O PV-Calc. 670-680 C, cc/g | | 0.500 | |
| H2O PV Pre-reduction Cat., cc/g | | 0.341 | |
| Crushing Strength Calc. Cat.-lb/mm | | 6.79 | |
| Crushing Strength Pre-reduction Cat.-lb/mm | | 8.04 | |
| Stickiness | | no | |
| Extruder head | | lukewarm | |
| BET Area Calc. Cat., m2/g | 170 | | |

TABLE 7-continued

| Catalysts Prepared. | | |
|---|---|---|
| BET Area Pre-reduction Cat., m2/g | | 65 |
| BET PV Calc. Cat., cc/g | 0.494 | |
| BET PV Pre-reduction Cat., cc/g | | 0.341 |
| BET Pore Diameter Calc. Cat., nm | | |
| BET Pore Diameter Pre-reduction Cat., nm | 9 | 20.4 |

Example 3—Pore Volume, Pore Diameter, and MLOI

Figure 5A:
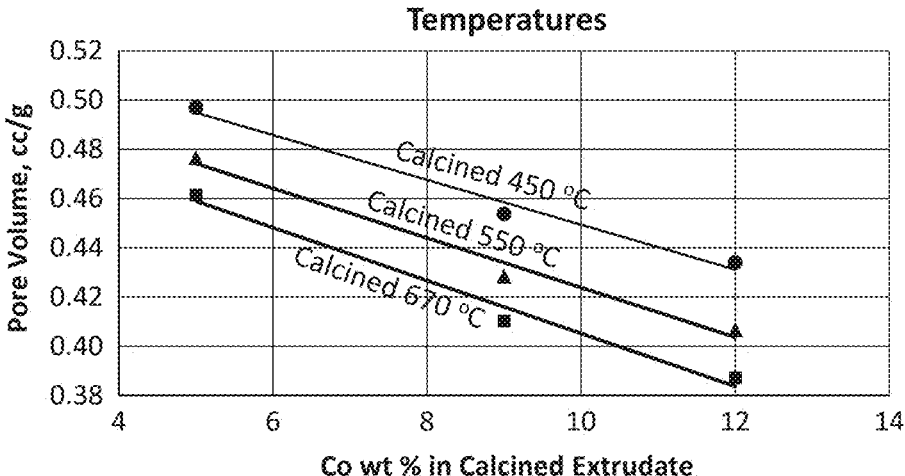
FIG. 5A illustrates the catalyst pore volume with various cobalt weight percentages and calcination temperatures, according to some embodiments.
Figure 5B:
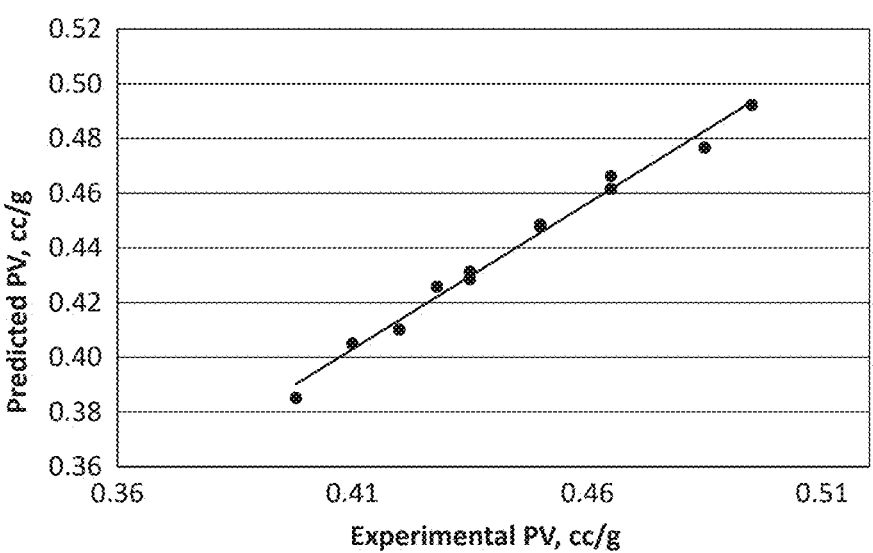
FIG. 5B illustrates a parity plot for predicted vs. experimental pore volume, according to some embodiments.

FIG. 5A illustrates the catalyst pore volume with various cobalt weight percentages, according to some embodiments. FIG. 5A illustrates the changes in pore volume based on the calcination temperature (at 450° C., 550° C., and 670° C.). Generally, as the calcination temperature increases, the pore volume also increases. The MLOI's for the data shown in FIG. 5 varied between 41.1 to 43. An empirical predictive equation was developed for the data above, which applies for extrudates containing 100% Pural 100 boehmite and a MLOI similar to the range used for these preparations. The empirical equation used for the prediction of the PV was: $PV=0.638 \times Co$ wt $\%^{(0.0002 \times T-0.346)}$, where T=temperature (K). A parity plot for the predicted and experimental PV is shown in FIG. 5B. The fitting confirms the shape of the equation. This equation as well as FIG. 5A show that the Co wt. % in the extrudate has a negative exponential effect on PV while the temperature has a negative effect. FIG. 5A shows that the wt. % of Co has a higher affect than the practical range of calcination temperature of the extrudate.

In one example, the calcination temperature of the extrudate at the lower end is limited by the lower practical temperature of between about 450 to 500° C. This temperature covers the onset of the formation of the gamma alumina. This alumina phase is preferred over the unstable boehmite phase for the Fischer-Tropsch application. In another example, the calcination temperature of the extrudate at the upper end is limited by the practical upper end of the calcination of between 665 to 725° C. The reason for this upper end is the formation of cobalt aluminates at higher temperatures. The aluminates begin reduction at temperatures higher than about 650° C. Therefore, at all calcination temperatures higher than the upper limit, the cobalt in the extrudate is lost for catalytic purposes.

Figure 6A:
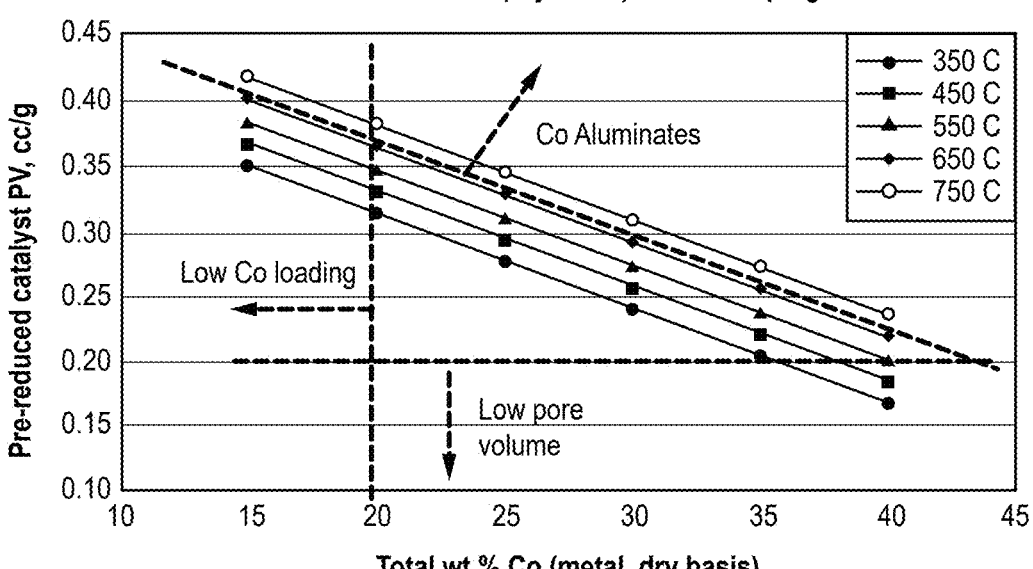
FIG. 6A illustrates the effect of cobalt addition prior to shaping on the final catalyst pore volume, according to some embodiments.
Figure 6B:
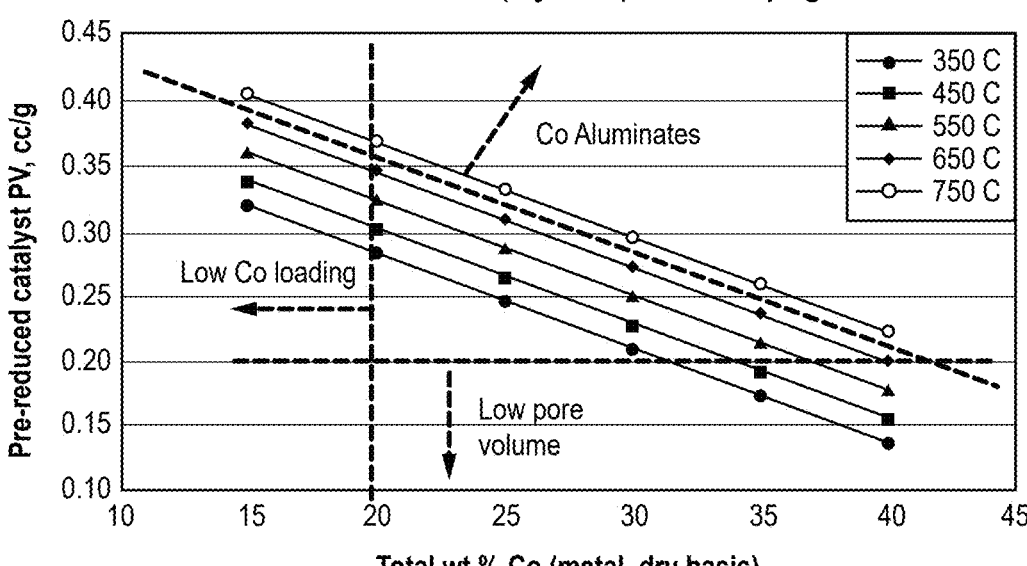
FIG. 6B illustrates the effect of cobalt addition prior to shaping on the final catalyst pore volume, according to some embodiments.

FIG. 6A illustrates the effect of cobalt addition prior to shaping on the final catalyst pore volume, according to some embodiments. The physical properties of 5 wt. % cobalt metal (dry basis) (about 25% of the final catalyst cobalt loading) prior to shaping are illustrated in FIG. 6A. FIG. 6B illustrates the effect of cobalt addition prior to shaping on the final catalyst pore volume, according to some embodiments. The physical properties of 12 wt. % cobalt metal (dry basis) (about 60% of the final catalyst cobalt loading) prior to shaping are illustrated in FIG. 6B. Both preparations were suitable for extrusion at the commercial scale (such as suitable paste properties, extrudates degree of stickiness, extrudates separation after drying/calcining, and extruder temperature). In one example, below about 5 wt. % cobalt metal (dry basis) prior to shaping, the preparation cost of the catalyst would increase due to the increase in preparation and impregnation steps. In some cases, a lower catalyst activity is preferred (such as for the top of the reactor or to optimize a multi-reactor stages plant), in which case less than 5 wt. % cobalt metal (dry basis) prior to shaping may be acceptable.

In one example, FIG. 6B illustrates that the final catalyst may include up to about 75 wt. % to 85 wt. % cobalt from the pre-shaped cobalt addition. In other embodiments, the final catalyst may include 100 wt. % cobalt from the pre-shaped cobalt addition. Here, by choosing the highest calcination temperature before the formation of cobalt aluminates, will make it possible to reach almost 35% of Co metal in the final catalyst. In one example, adding above 75 wt. % to 85 wt. % cobalt from the pre-shaped cobalt addition in the final catalyst may result in stickiness of the extrudates.

Figure 7:
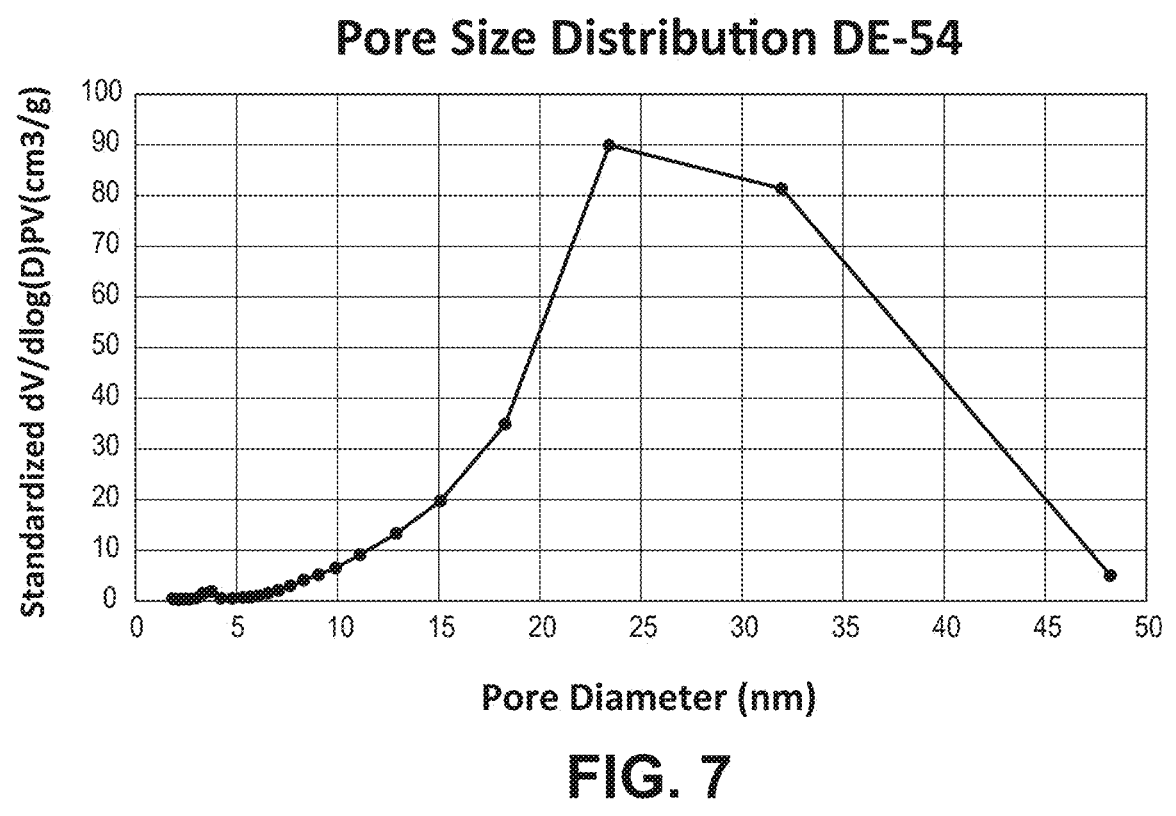

FIG. 7 illustrates the pore size distribution of a Fischer-Tropsch catalyst, according to some embodiments. As shown in FIG. 7, the pore diameter of the DE-54 catalyst may range from about 5 nm to about 50 nm. In one example, the average pore diameter ranges from about 10 nm to about 40 nm. In another example, the average pore diameter ranges from about 15 nm to about 30 nm.

Figure 8:
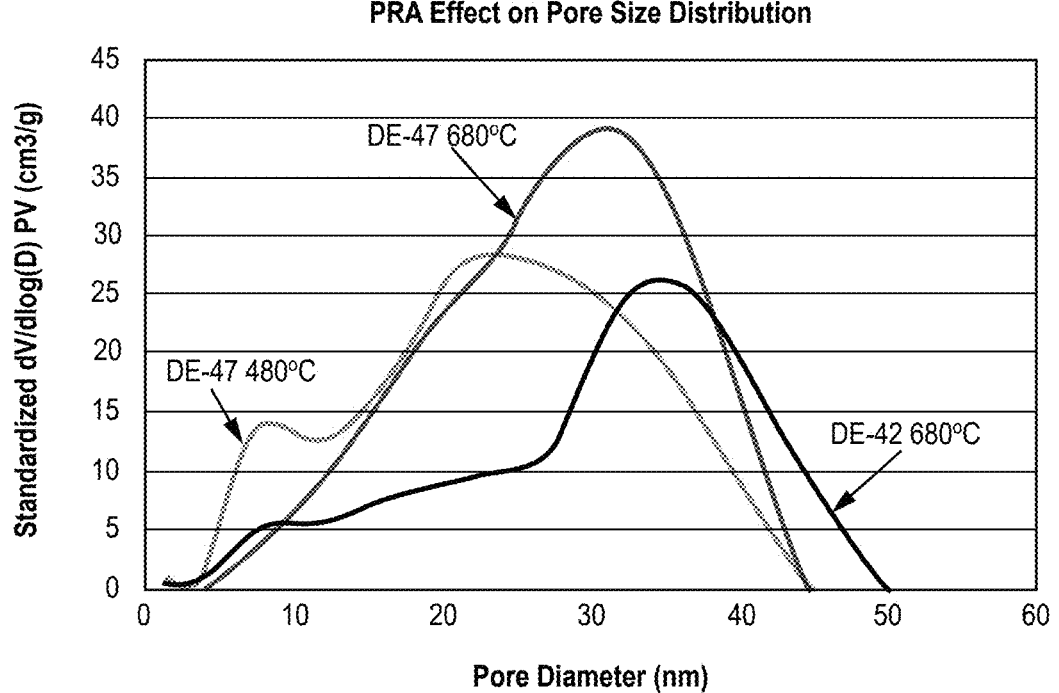
FIG. 8 illustrates the pore regulating agent (PRA) effect on pore size distribution, according to some embodiments.

FIG. 8 illustrates the pore regulating agent (PRA) effect on pore size distribution, according to some embodiments. Catalyst DE-47 is similar to DE-42, except for using polyethylene glycol (PEG) as a pore regulating agent (PRA). The PEG grade used is a low molecular weight (MW=3000). In some cases, higher molecular weight PEG may be utilized. PEG is a polymer that is very soluble in water at room temperature. The PRA effect on pore size distribution is shown for DE-42 and DE-47 at two different calcination temperatures (480° C. and 680° C.). By comparing the pore size distribution of materials calcined at the same temperature, it is clear that the PRA has an effect on the catalyst structure. BET data in Table 7 shows an increase for the PV, although there is also an increase on the surface area, and therefore the average pore diameter may remain unchanged.

Figure 9A:
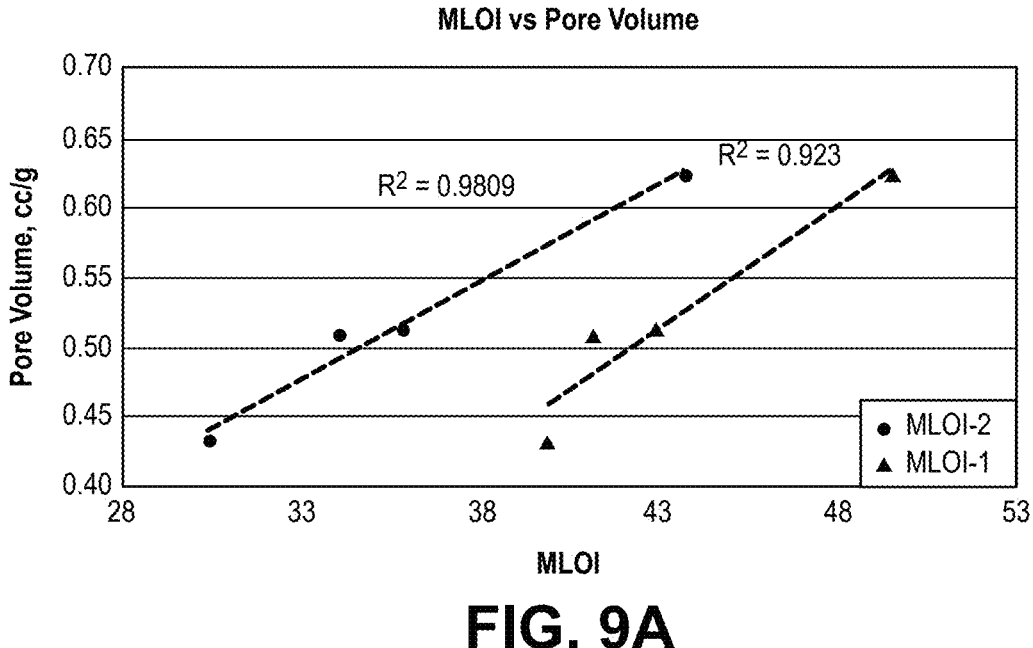
FIG. 9A illustrates the modified loss on ignition (MLOI) vs. pore volume, according to some embodiments.
Figure 9B:
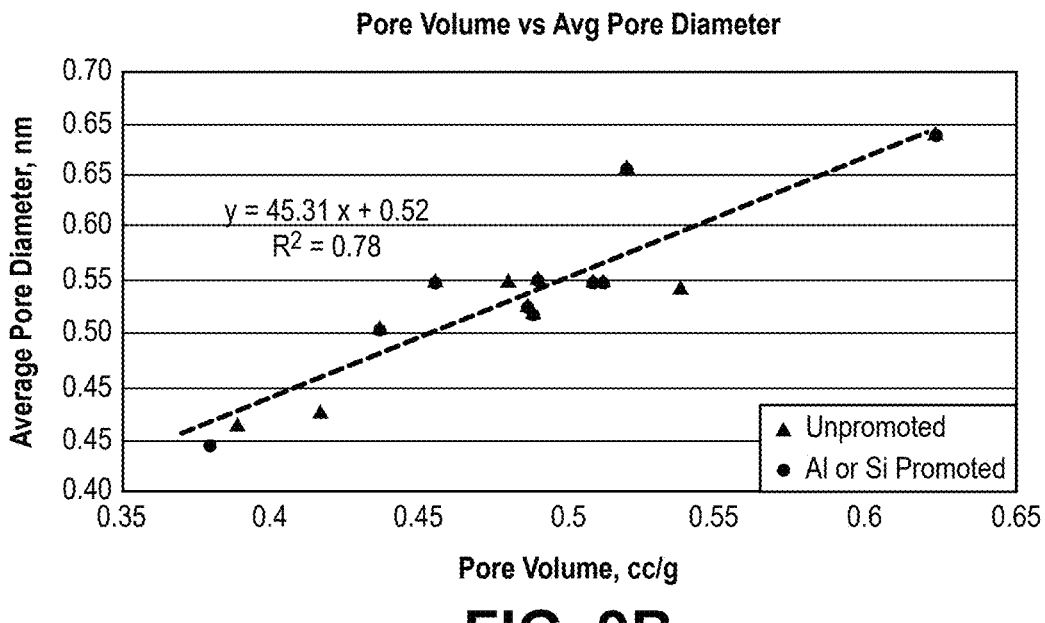
FIG. 9B illustrates the pore volume vs pore diameter, according to some embodiments.

FIG. 9A illustrates the modified loss on ignition (MLOI) vs. pore volume, according to some embodiments. FIG. 9A shows the correlations between the pore volume and the MLOI (DE-28, DE-29, DE-31, and DE-32) for a set of recipes with the same alumina (TH-200) and similar Co wt. % (9 to 11 wt. %) and calcination temperature (680° C.). FIG. 9B illustrates the pore volume vs pore diameter, according to some embodiments. This, along with FIG. 9A, illustrates that there is a linear relationship between MLOI and pore diameter. Accordingly, as the MLOI increases, the pore diameter also increases.

Example 4—Crushing Strength

Figure 10:
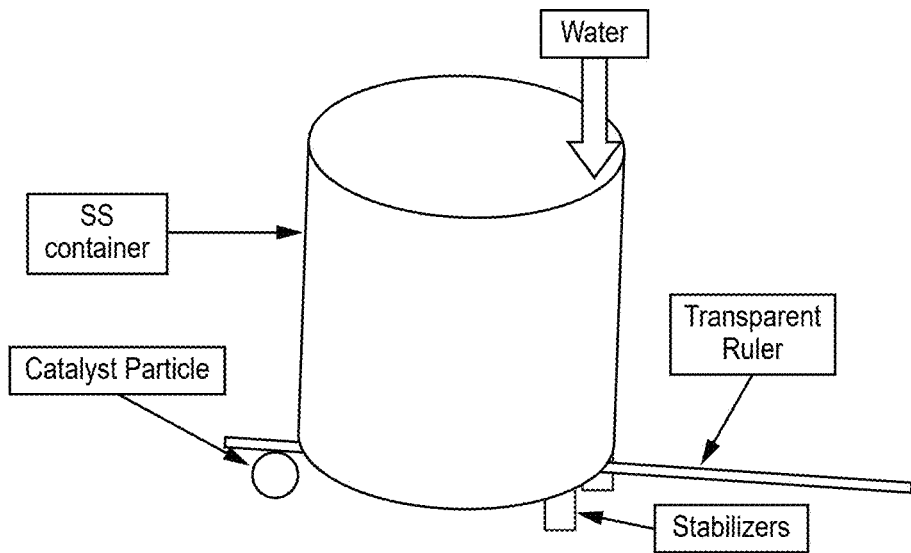
FIG. 10 illustrates an apparatus for testing crushing strength, according to some embodiments.

FIG. 10 illustrates an apparatus for testing crushing strength, according to some embodiments. An easier and more accurate test to measure the intrinsic cohesion or mechanical strength of a particle is its resistance to crushing or crushing strength. The pressure drop in the reactor increases as the average particle size gets smaller. Therefore, it is preferable that the catalyst particles have a high mechanical strength to avoid breakage during the different stages of the catalyst preparation, transport, and loading in reactor. The measurement of the bulk mechanical strength of particles is difficult if the test measures the breakage into smaller sizes. This is because of the inverse relationship between breakage and particle size. Accordingly, a technique was developed to test the crushing strength.

Water is gradually added by the stabilizers end of a stainless steel container until the catalyst particle breaks. Some rules of the test are as follows: (1) preferred size is between 1.3 to 1.8 mm. In practice, the typical range may be from 1 to 2.5 mm. This range is to minimize the curvature of the particle. (2) If there is a "click" sound at the beginning of the test the test is discarded. The sound means that the particle broke in two pieces due to its curvature. (3) If there is a fine separating fast from the particle (usually is visible and separate at high linear velocity) at the beginning of the test, the test is discarded. This means that the tri-lobed particle was in a non-stable position with respect to the ruler. (4) It is preferable to select particles that do not need further breaking. If a relatively large amount of particles higher than 2.2 mm are present, select some of the larger particles and break to desired size. While the stainless steel vessel could have any practical diameter, the same vessel diameter must be used for all tests to standardize the technique.

Figure 11:
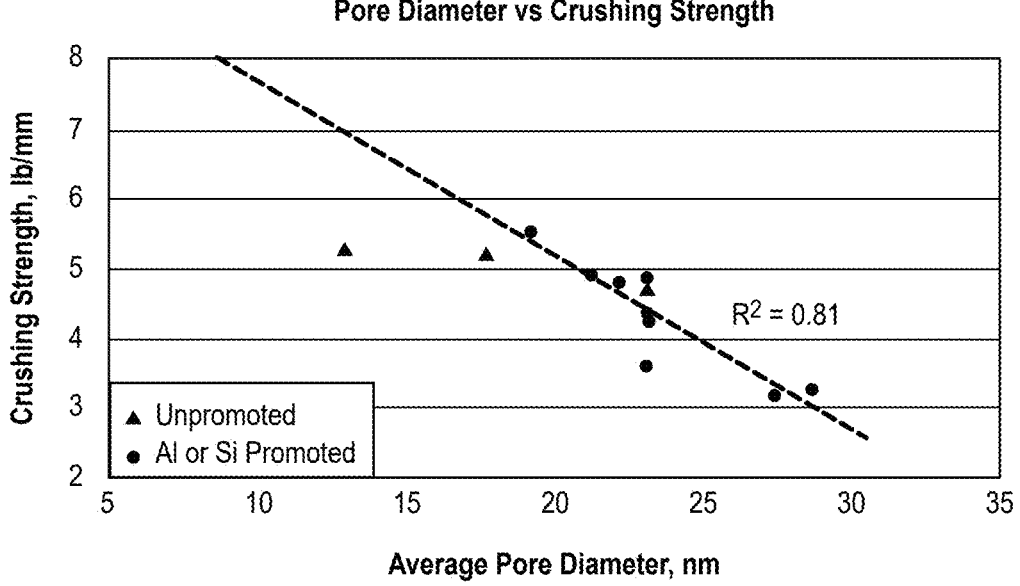
FIG. 11 illustrates the pore diameter vs. crushing strength, according to some embodiments.

FIG. 11 illustrates the pore diameter vs. crushing strength, according to some embodiments. As expected, the crushing strength (CS) decreases with the average pore diameter. The data shows the unpromoted crushing strength and the Al or Si promoted crushing strength. It is clear that in order to obtain a good crushing strength (i.e. higher than 5 kg/cm) and while still having a PD equal to or larger than 20 nm, it may be necessary to use an additional structural promoter such as Si or Al. Table 7 also shows that preparations reached that objective. DE-44 has a CS of 5.94 and DE-54 (60% TH-200 instead of 50% for DE-44) has a CS of 5.54. Further, since the crushing strength is negatively affected by the pore volume or pore diameter, it follows that the MLOI should not be too high to cause the catalyst particle to be weaker than a predetermined CS value, such as about 1.5 kg/mm, such as about 1.8 kg/mm, or such than 2.0 kg/mm.

Example 5—Reducibility

Figure 12:
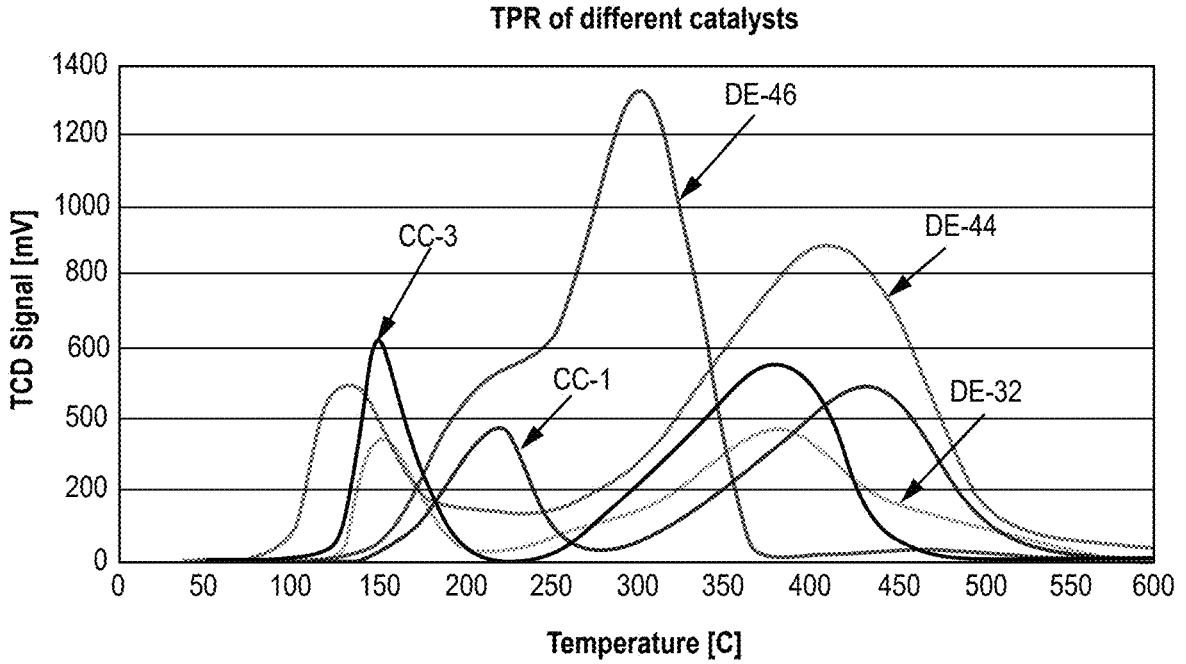
FIG. 12 illustrates temperature programmed reduction (TPR) of various catalysts, according to some embodiments.

FIG. 12 illustrates temperature programmed reduction (TPR) of various catalysts, according to some embodiments. According to FIG. 12, although the first reduction phase transition for DE-46 takes place at a higher temperature, the more important second phase transition (CoO to Co), although it begins at a temperature similar to DE-44, it is completed much sooner. This faster rate of reduction is an indication of no small Co crystallites or a much lower fraction of them as compared to conventional/comparison catalysts.

Figure 13:
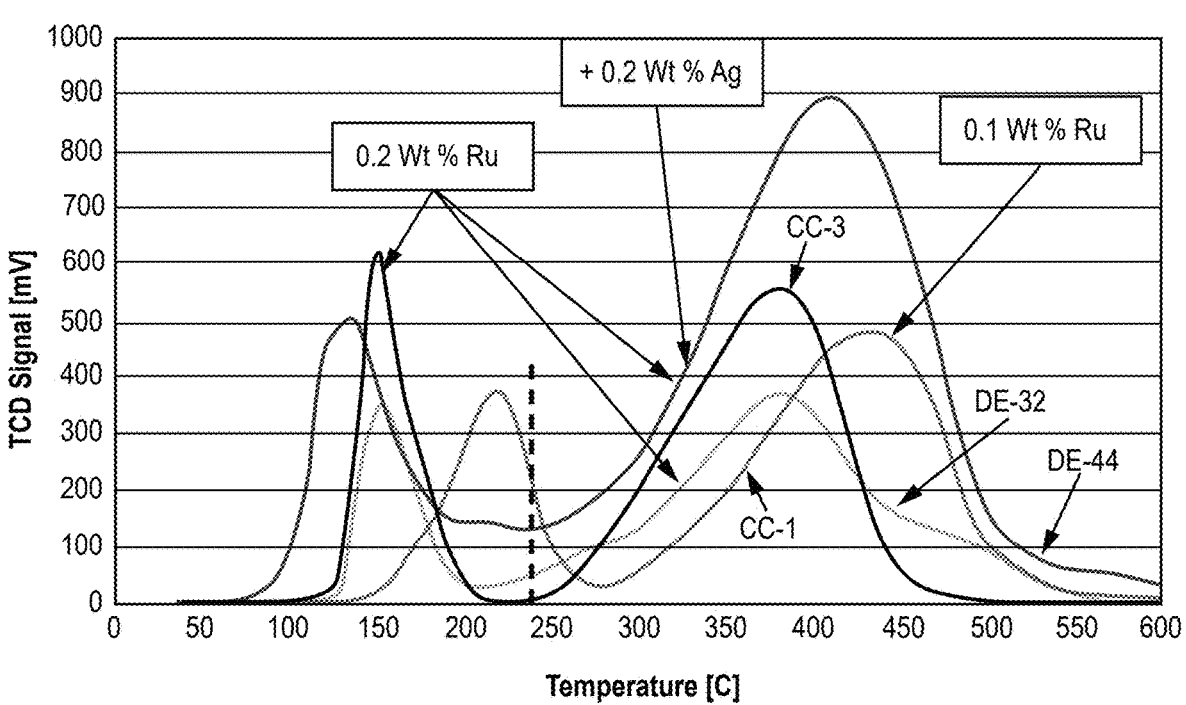
FIG. 13 illustrates programmed temperature reduction (TPR) of various catalysts with different amounts of Ru, according to some embodiments.

FIG. 13 illustrates the TPR of various catalysts, according to some embodiments. FIG. 13 shows the TPR's of 2 more catalysts: DE-32 and DE-44. The first one, DE-32, has been prepared with the cobalt nitrate mixed with the alumina powder before extrusion, and calcined at 680° C. after extrusion, a following additional Co impregnation and 0.2 wt. % Ru added in an impregnation by itself. The DE-44 catalyst was prepared in a similar manner to DE-32, but, in addition, 0.2 wt. % of Ag was added together with the cobalt nitrate to the alumina powder before extrusion. FIG. 13 shows catalysts prepared with 0.2 wt. % of Ru have a better reducibility than those prepared with 0.1 wt. % Ru in the catalyst. Also, by adding Ag before the extrusion or shaping step the reducibility is further improved. FIG. 13 further shows that the reducibility of DE-32 and DE-44 is equal or better than that of the CC catalysts, in particular the second Co transformation phase or CoO to Co.

In FIG. 13, there seems to be full reduction of the cobalt oxide. This means that there were no cobalt aluminates formed during the calcination of the extrudate. This demonstrates that 680° C. is a safe temperature for the calcination of the extrudate. One difference between DE-32/44 and the CC catalysts may be the onset of the second reduction peak. For DE-32 and DE-44, the signal for the first peak does not reach zero before the second peak begins, as is the case for CC. Accordingly, the catalysts of the present disclosure are prepared without any negative effects on reducibility.

Further, the onset of the first peak is now equal to or even lower than that for CC and DE-32. It is clear that the signal for the first reduction peak does not reach zero before the second and more important reduction peak begins. The fact that the beginning of the second Co phase transformation begins sooner than that for the CC's shows the target temperature of 246° C. (as shown in FIG. 13 by the dotted red line) occurs at a height of about 15% of the maximum height (for the TPR equipment specific operating conditions used). It is then possible to reduce the catalyst at a temperature reachable using boiling water to heat the reactor tubes during the reduction step instead of using a more expensive hot oil system, without detriment to catalytic performance.

Example 6—Catalyst Performance

The catalyst activity was measured using Equation 3. This equation was developed based on kinetic data from a fixed bed demonstration reactor with nine 20' by 0.875" ID reactor tubes. This equation was used to analyze data from a fixed bed reactor run that lasted 100 days. The alpha value is sensitive to the operating conditions of the reactor. It also tends to show an increase with time until it reaches its maximum value between 2 to 4 weeks into the run, depending upon the reactor used and the operating conditions. In order to have an unbiased comparison, the alpha values from the different catalysts were compared with the predicted alpha values as a function of the operating conditions and time on line. The data used for the development of the equation was obtained from a fixed bed demonstration reactor running with a CC catalyst. This equation predicts an alpha factor and then uses it to convert it to the alpha value, according to the Equations 7 and 8:

$$\alpha_{factor} = 0.0005\ e^{(54000/RT)} P_{H2}^{-0.3} P_{CO}^{0.49} P_{H2O}^{0.18} \left(1 + P_{CO2}\right)^{0.012} t^{0.2} \quad (7)$$

$$\alpha = 0.000016 \alpha_{factor} + 0.8714 \quad (8)$$

where R=universal gas constant, T=temperature (K), P=partial pressure, and t=time in hours.

Table 8 lists the pore volume, pore diameter, and experimental activity of various catalysts tested in laboratory micro reactors. As shown, the pore volume and the pore diameter have a direct affect on the activity of the catalyst.

TABLE 8

| | | | | |
|---|---|---|---|---|
| Catalyst pore volume, pore diameter, and activity. | | | | |
| Catalyst | PV cc/g | PD nm | PV $^{0.5}$ X PD $^{0.65}$ | Experimental Kt/1E14 |
| CC-2 | 0.30 | 26.0 | 4.55 | 1.15 |
| CC-1 | 0.269 | 25.8 | 4.29 | 1.2 |
| DE-13 | 0.29 | 13.0 | 2.85 | 0.75 |
| DE-16 | 0.31 | 17.7 | 3.60 | 1 |
| DE-32 | 0.354 | 23.1 | 4.58 | 1.25 |
| DE-44 | 0.352 | 23.3 | 4.59 | 1.24 |

Figure 14:
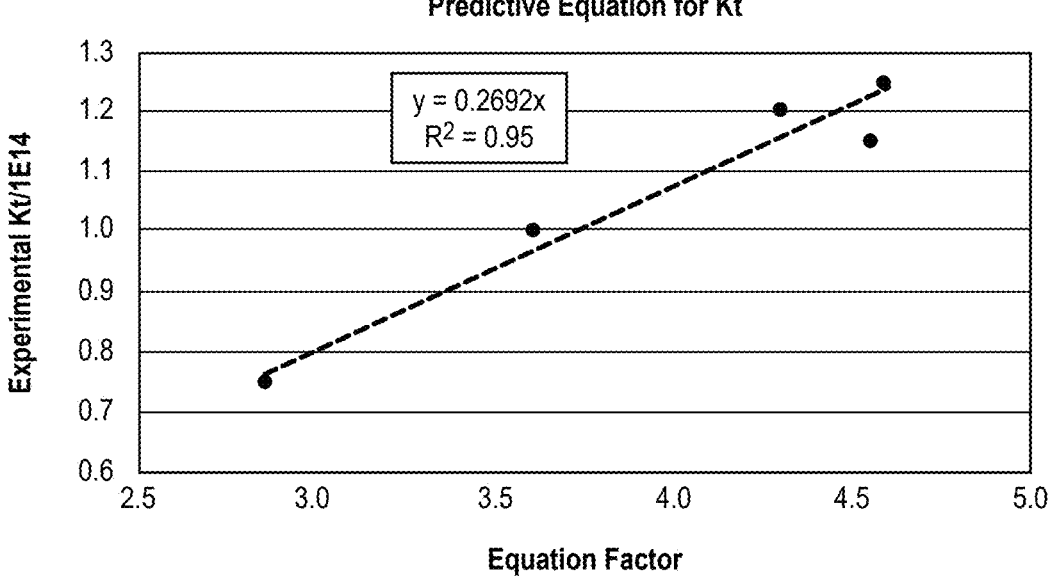
FIG. 14 illustrates a predictive plot including the equation factor for activity, according to some embodiments.

After an optimization for the interaction between the PV and the PD, it was found that the catalyst activity has a very good correlation with: Kt=function $(PV^{0.5} \times PD^{0.65})$. FIG. 14 illustrates a predictive plot including the equation factor for activity, according to some embodiments. The experimental activity correlates with the PV and PD according to the equation: $K_t = 2.692 \times 10^{13} \times PV$ $0.5 \times PD^{0.65}$, where PV is expressed in cc/g and PD in nm. In one example, a Kt of 1.2E13 means that: PV $0.5 \times PD^{0.65} = 4.2$. Table 9 displays the experimental vs. predicted Kt values for various catalysts.

TABLE 9

| | | |
|---|---|---|
| Experimental vs. predicted Kt. | | |
| Catalyst | Experimental Kt/1E14 | Predicted Kt/1E14 |
| CC-2 | 1.15 | 1.23 |
| CC-1 | 1.2 | 1.15 |
| DE-13 | 0.75 | 0.77 |
| DE-16 | 1 | 0.97 |
| DE-32 | 1.25 | 1.23 |
| DE-44 | 1.24 | 1.24 |

The Fischer-Tropsch reaction is characterized for producing a small amount of very large HC molecules. With time, these large molecules may accumulate and block the pores. The presence of this mechanism is a function of not only the rate of reaction and the alpha value, but also of the pore diameter distribution. The higher observed FT rate is related to the average pore diameter or even with the presence or ratio of macro/meso pores. The pore diameter not only has an influence on the diffusion but also on the cobalt crystallite size distribution, which follows the pore size distribution. The present correlation, however, also shows the importance of the pore volume. An explanation may be that a higher pore volume—for any specific set of conditions—has a larger amount of CO and H2 dissolved in the liquid wax inside the catalyst particle. This, combined with a better diffusion due to a larger pore, results in a higher Fischer-Tropsch rate of production. The results obtained justify this approach of developing catalysts with a PD and PV as large as possible, within the limitations of available raw materials (alumina, its combinations or other metal oxides) and the negative effect on the mechanical strength. These results also justify the use of MLOI's as high as the mechanical strength and onset of sticky extrudate allows as well as additional structural promoters.

Discussion of Possible Embodiments

According to one aspect, a method of preparing a Fischer-Tropsch catalyst includes mixing a first precursor and a second precursor sufficient to form a mixture, wherein the first precursor includes cobalt and the second precursor includes one or more aluminum-containing compounds; shaping the mixture subsequent to mixing the first precursor and the second precursor sufficient to form a structure; drying the structure; calcining the structure sufficient to form the catalyst; and optionally adding one or more metals to the catalyst, wherein the catalyst includes a pore volume (PV) and an average pore diameter (PD) and the catalyst in the oxide form follows the formula: $PV^{0.5} \times PD^{0.65} > 2$, wherein PV is measured in cc/g and PD is measured in nm.

The method of the preceding paragraph can optionally include, additionally and/or alternatively any one or more of the following features, configurations and/or additional components.

Drying the structure may include heating at a temperature between 70° C. and 180° C.

Calcining the structure may include heating at a temperature below 500° C.

Calcining the structure may include heating at a temperature between 500° C. and 725° C.

The mixture may include a modified loss on ignition (MLOI) value between 30 and 60.

The first precursor may further include metal salt and wherein the catalyst includes metal oxide(s) and between 25 wt. % to 75 wt. % of the metal oxide(s) in the catalyst before reduction is present from the first precursor.

The metal salt may include one or more of iron and ruthenium.

The ruthenium may be added by an impregnation step without other metals.

The first precursor may include cobalt nitrate and wherein the catalyst includes cobalt oxide and between 25 wt. % to 75 wt. % of the cobalt oxide in the catalyst before reduction is present from the first precursor.

The first precursor may include cobalt nitrate and silver nitrate.

The aluminum-containing compound may include one or more of boehmite and alumina.

The second precursor may further include one or more of aluminum, silica, silicon, titania, titanium, zirconia, and zirconium.

The method may further include adding ruthenium subsequent to shaping the mixture.

The crushing strength (CS) of the catalyst may be greater than or equal to 1.8 kg/mm.

The one or more metals may be selected from cobalt, ruthenium, and iron.

The catalyst may include a blend of cobalt and alumina, wherein the catalyst includes a pore volume (PV) ranging from 0.3 cc/g to 0.5 cc/g and an average pore diameter (PD) ranging from 18 nm to 30 nm.

The catalyst may be unsupported.

The catalyst may be used in a fixed bed, slurry, ebullient bed, or fluidized bed Fischer-Tropsch reactor, and wherein the catalyst is used to produce directly or from further treatment of the Fischer-Tropsch primary products, light olefins, gasoline, diesel, paraffins, jet fuel, wax, lubes, drilling fluids, primary olefins and hydrocarbon based chemicals.

According to another aspect, a Fischer-Tropsch catalyst includes a substantially homogeneous blend of cobalt and alumina, wherein the catalyst includes a pore volume (PV) ranging from 0.3 cc/g to 0.5 cc/g and an average pore diameter (PD) ranging from 18 nm to 30 nm.

The catalyst of the preceding paragraph can optionally include, additionally and/or alternatively any one or more of the following features, configurations and/or additional components.

The pore volume and the average pore diameter may follow the formula: $PV^{0.5} \times PD^{0.65} > 2$, wherein PV is measured in cc/g and PD is measured in nm.

The weight percentage of cobalt in the catalyst may range from about 20 wt. % to about 40 wt. %.

The catalyst may be unsupported.

The catalyst may further include cobalt in contact with pore walls of the alumina.

The catalyst may further include one or more of silica, silicon, titania, titanium, zirconia, and zirconium.

The catalyst may further include one or more of platinum, palladium, ruthenium, and silver.

The catalyst may include the product of mixing cobalt nitrate and silver nitrate with alumina prior to extrusion and calcination.

25 wt. % to 75 wt. % of the cobalt in the catalyst after calcination and prior to reduction may be present from the mixing of cobalt nitrate and silver nitrate with alumina.

The cobalt nitrate solution may include about 10 wt. % cobalt to about 20 wt. % cobalt and the catalyst is reduced at a temperature below 500° C.

The catalyst may be reduced at a temperature of 260° C. or less.

According to another aspect, a method of preparing a Fischer-Tropsch catalyst includes mixing a first precursor and a second precursor sufficient to form a mixture, wherein the first precursor includes cobalt and the second precursor includes one or more aluminum-containing compounds; shaping the mixture sufficient to form a structure; drying the structure at a temperature between about 70° C. and about 180° C.; calcining the structure at a temperature between about 450° C. and about 750° C. sufficient to form the catalyst; and optionally adding one or more metals to the catalyst, wherein the catalyst includes cobalt oxide, and wherein at least 25 wt. % of the cobalt oxide in the catalyst before reduction is provided by the first precursor.

The method of the preceding paragraph can optionally include, additionally and/or alternatively any one or more of the following features, configurations and/or additional components.

The catalyst may include a pore volume (PV) and an average pore diameter (PD) following the formula: $PV^{0.5} \times PD^{0.65} > 2$, wherein PV is measured in cc/g and PD is measured in nm.

The first precursor may further include a reduction promotor selected from one or more of platinum, palladium, ruthenium, and silver.

The first precursor may further include one or more of nano cobalt metal particles, nano ruthenium metal particles, and nano silver metal particles.

The reduction promotor may be added to the mixture before shaping the mixture.

The aluminum-containing compound may include one or more of boehmite and alumina.

The second precursor may further include one or more of aluminum, silica, silicon, titania, titanium, zirconia, and zirconium.

The mixture may include a modified loss on ignition (MLOI) value between 30 and 60.

Shaping the mixture may include extruding the mixture.

Shaping the mixture may include spray drying the mixture.

The method may further include the addition of a pore regulating agent, wherein the pore regulating agent includes a polymer including two or more of elements C, H, O, and N.

The method may further include adding a reduction promoter subsequent to shaping the mixture, wherein the reduction promotor includes one or more of ruthenium and iron.

The cobalt in the first precursor may be in the form of a cobalt nitrate solution, and wherein the cobalt nitrate solution has a cobalt concentration between 10 wt. % to 20 wt. %.

The one or more metals may be selected from cobalt, ruthenium, and iron.

The method may further include adding cobalt nitrate and/or acetate subsequent to shaping the mixture.

The catalyst may include a blend of cobalt and alumina, wherein the catalyst includes a pore volume (PV) ranging from 0.3 cc/g to 0.5 cc/g and an average pore diameter (PD) ranging from 18 nm to 30 nm.

Between 25 wt. % to 75 wt. % of the cobalt oxide in the catalyst before reduction may be present from the first precursor.

100% of the cobalt oxide in the catalyst before reduction may be present from the first precursor.

The method may further include hydrogen treatment of the catalyst sufficient to reduce the cobalt oxide.

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. A catalyst, comprising:
a blended structure including a first cobalt component and an aluminum-containing compound alumina, the first cobalt component and the aluminum-containing compound being substantially uniformly distributed throughout the blended structure; and
a second cobalt component in contact with an outer surface of the blended structure, the second cobalt component added to the outer surface of the blended structure using impregnation;
wherein a total weight percentage of cobalt in the catalyst ranges from 10 wt. % to 40 wt. % of a total weight of the catalyst and a total weight percentage of alumina ranges from about 50 wt. % to about 90 wt. % of the total weight of the catalyst;
and wherein the first cobalt component present in the blended structure accounts for 20% to 75% of the total weight percentage of cobalt in the catalyst.

2. The catalyst of claim 1, wherein the catalyst is in an oxide form, and wherein the cobalt is in the form of cobalt oxide.

3. The catalyst of claim 1, wherein a pore volume (PV) ranges from 0.3 cc/g to 0.5 cc/g and an average pore diameter (PD) ranges from 18 nm to 30 nm.

4. The catalyst of claim 1, further including a silver component.

5. The catalyst of claim 4, wherein a weight percentage of the silver component ranges from about 0.01 wt. % to about 10 wt. % of the total weight of the catalyst.

6. The catalyst of claim 1, further including a ruthenium component.

7. The catalyst of claim 1, wherein a crushing strength of the catalyst is greater than 2 kg/mm.

\* \* \* \* \*